Figure 1:
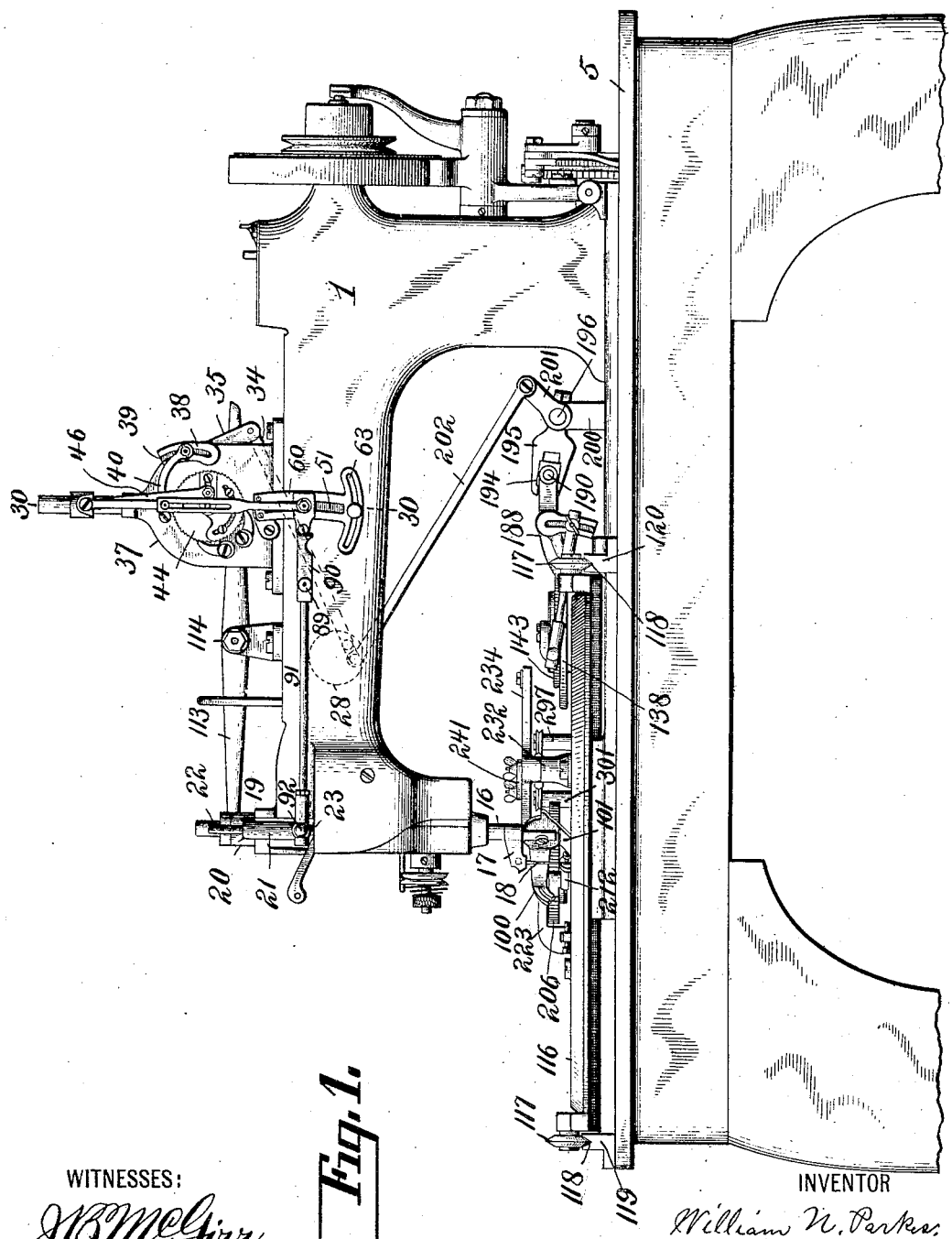

No. 875,626. PATENTED DEC. 31, 1907.
W. N. PARKES.
EMBROIDERY OR ORNAMENTAL STITCH SEWING MACHINE.
APPLICATION FILED DEC. 8, 1905.

17 SHEETS—SHEET 1.

WITNESSES:
J. B. McGirr.
W. W. Ketchum

INVENTOR
William N. Parkes.

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 3.

WITNESSES:
J. B. McGivr.
W. W. Ketchum

INVENTOR
William N. Parkes

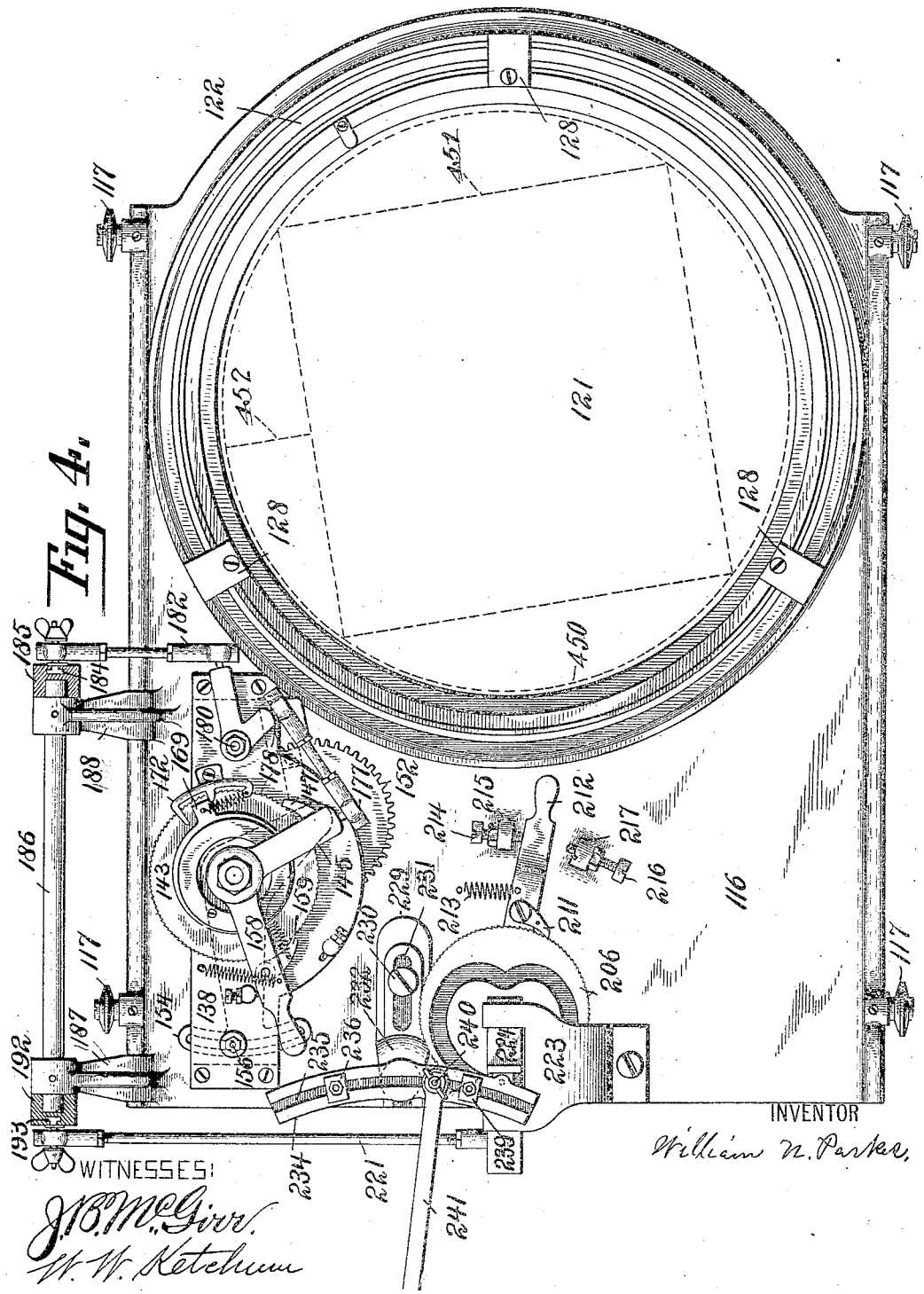

No. 875,626.
W. N. PARKES.
EMBROIDERY OR ORNAMENTAL STITCH SEWING MACHINE.
APPLICATION FILED DEC. 8, 1905.
PATENTED DEC. 31, 1907.
17 SHEETS—SHEET 5.
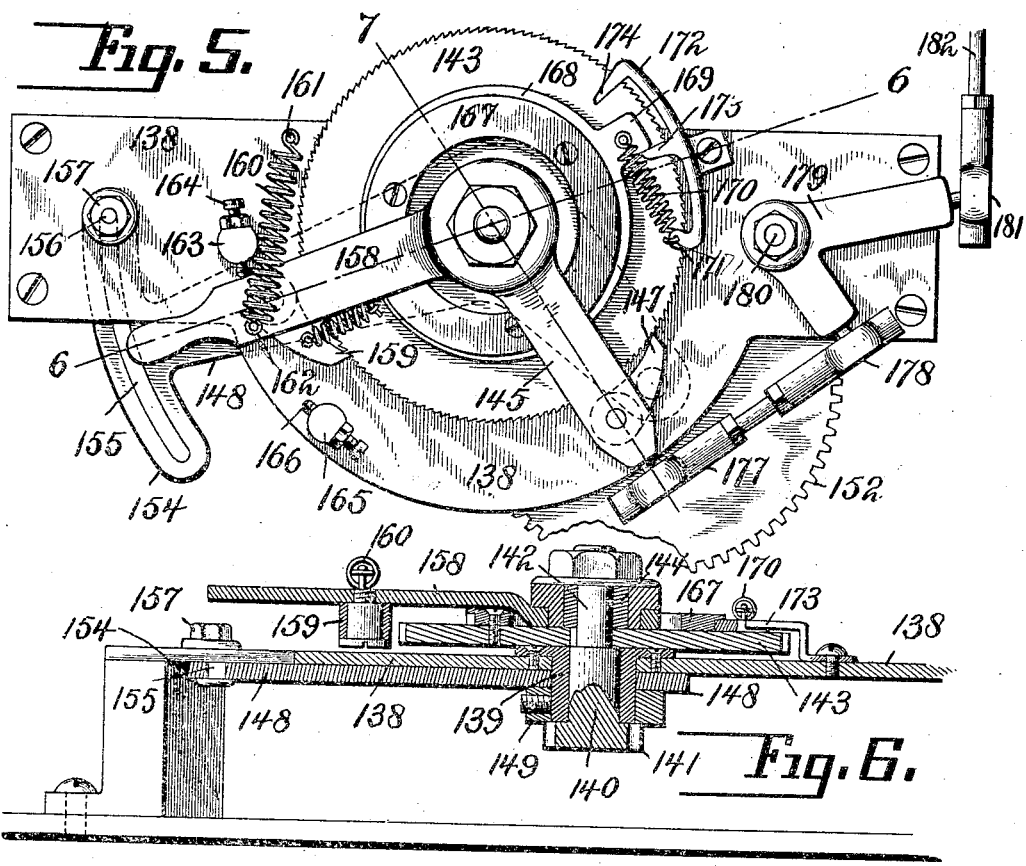
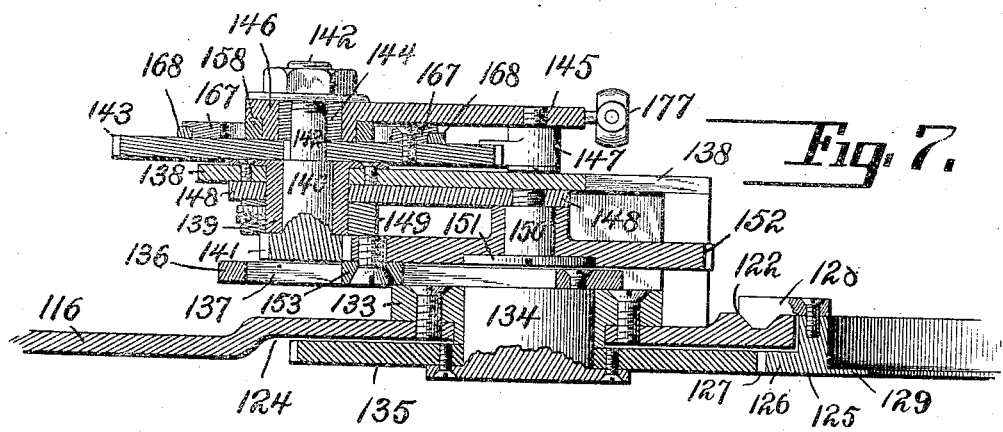
WITNESSES:
J. B. McGinn
W. W. Ketcham
INVENTOR
William N. Parkes No. 875,626.  
W. N. PARKES.  
PATENTED DEC. 31, 1907.
EMBROIDERY OR ORNAMENTAL STITCH SEWING MACHINE.  
APPLICATION FILED DEC. 8, 1905.
17 SHEETS—SHEET 6.
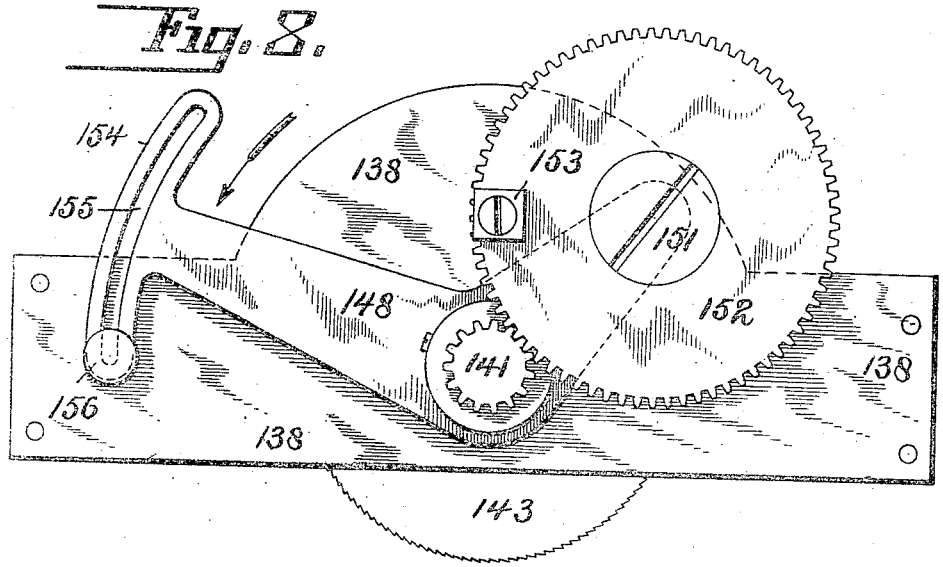
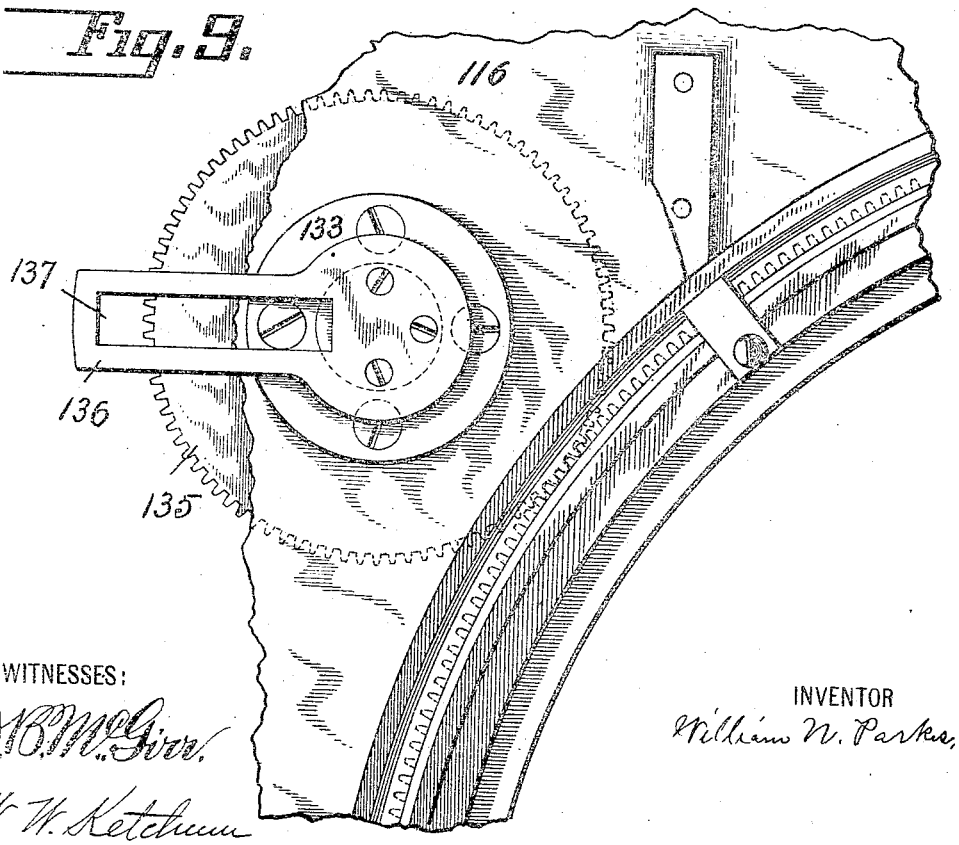
WITNESSES:
INVENTOR  
William N. Parkes, No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 7.

WITNESSES:
J. B. McGirr.
W. W. Ketchum

INVENTOR
William N. Parkes.

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 8.
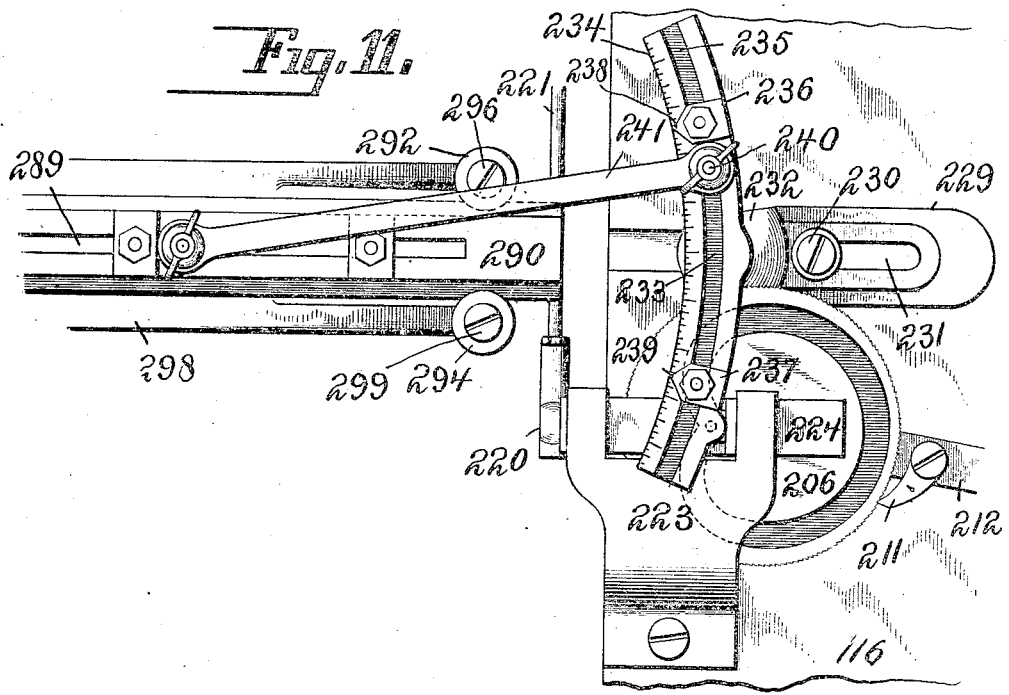
WITNESSES:
INVENTOR
William N. Parkes.

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 9.
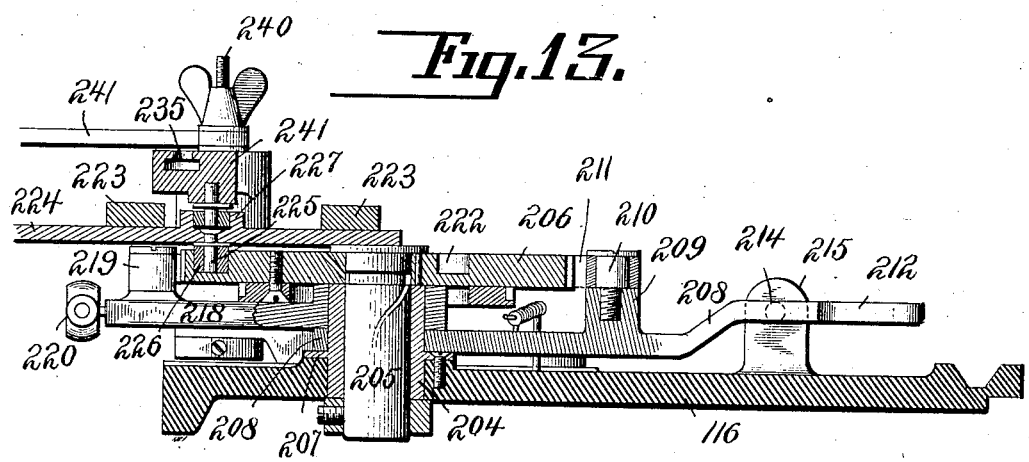
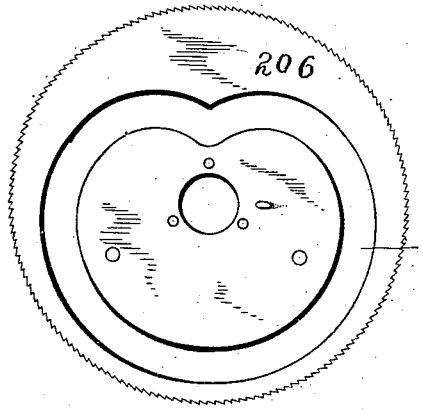
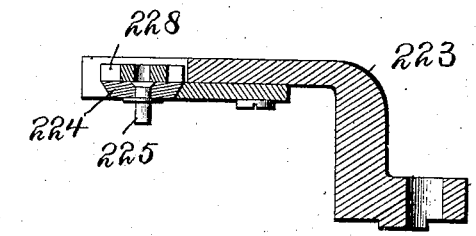
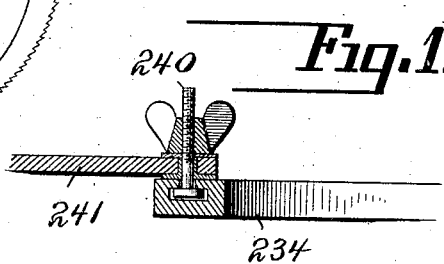
WITNESSES:
J. B. McGirr.
W. W. Ketchum.
INVENTOR
William N. Parkes, No. 875,626. PATENTED DEC. 31, 1907.
W. N. PARKES.
EMBROIDERY OR ORNAMENTAL STITCH SEWING MACHINE.
APPLICATION FILED DEC. 8, 1905.

17 SHEETS—SHEET 10.

WITNESSES:
J. B. McGirr.
W. W. Ketchum

INVENTOR
William N. Parkes

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 11.
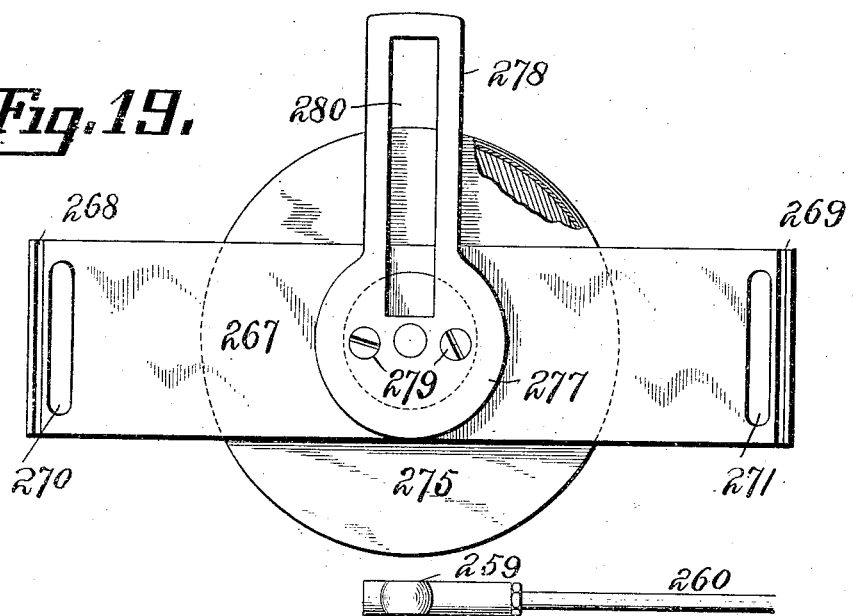
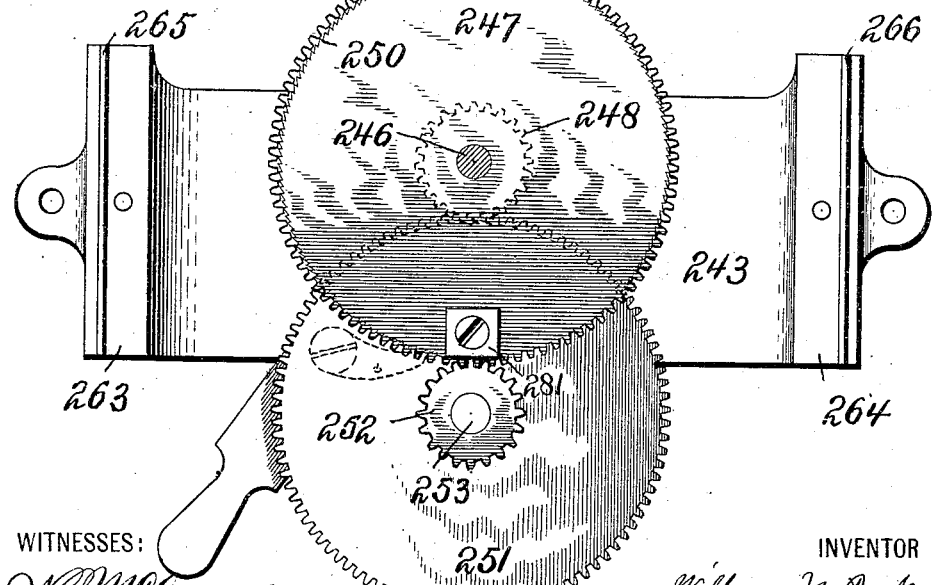
WITNESSES:
INVENTOR
William N. Parkes.

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 12.
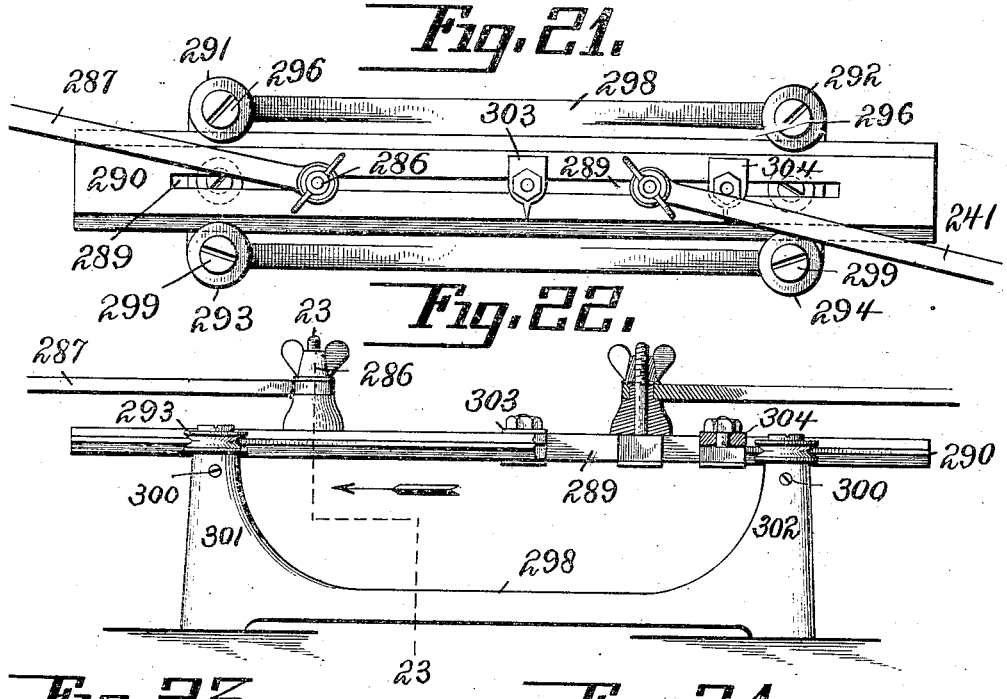
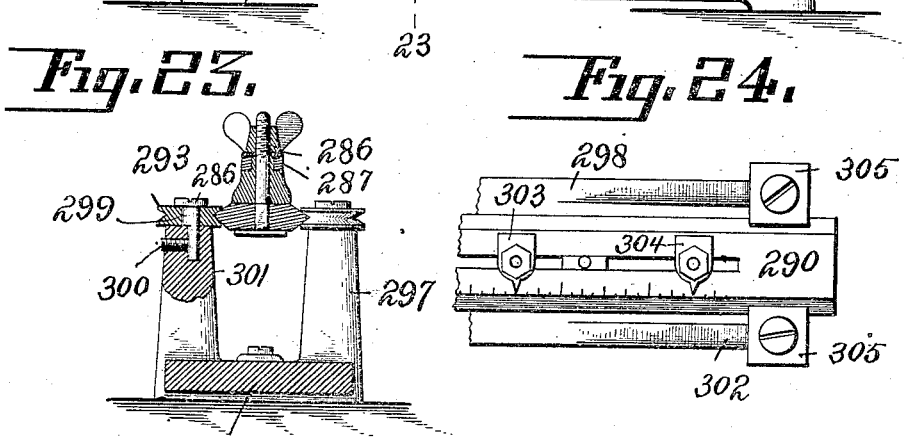
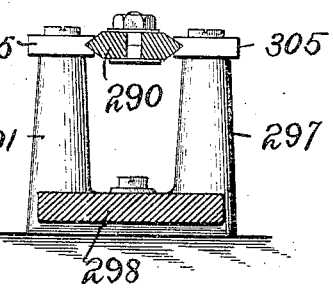
WITNESSES:
J.B. McGivr.
W.W. Ketchum.
INVENTOR
William N. Parkes

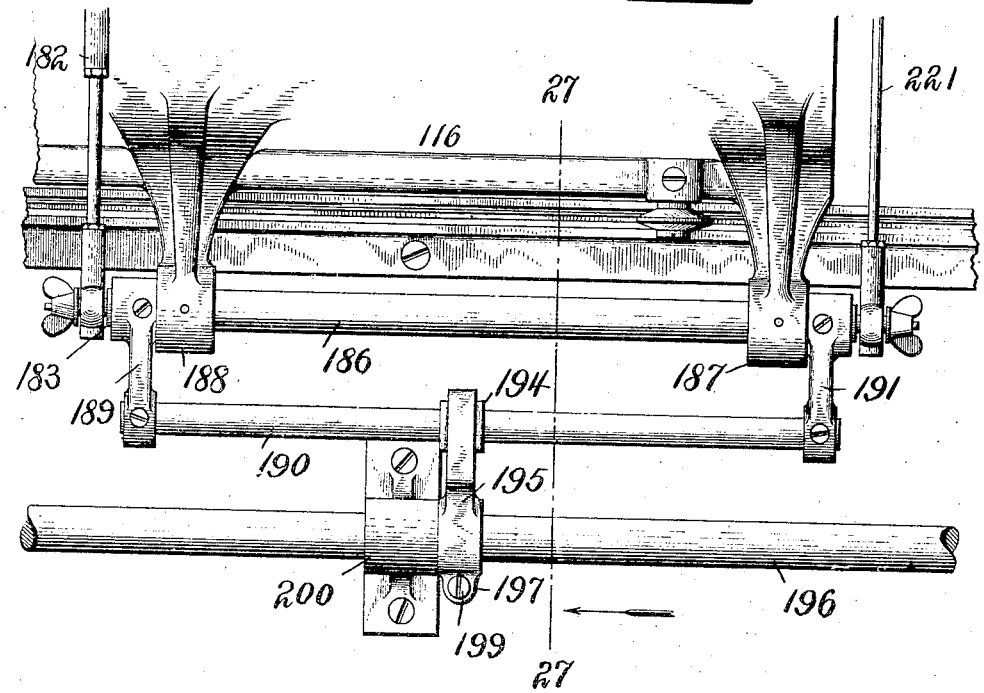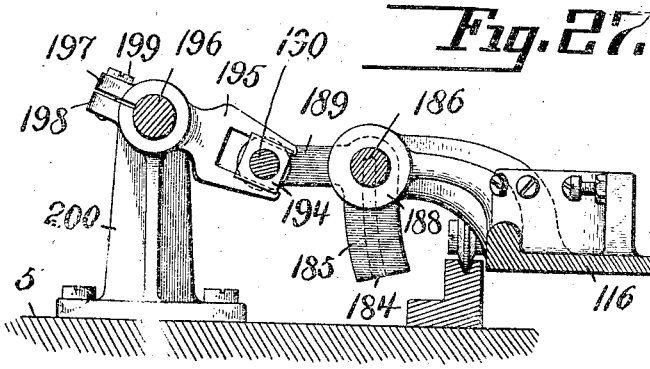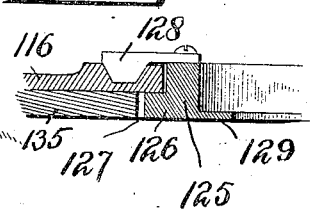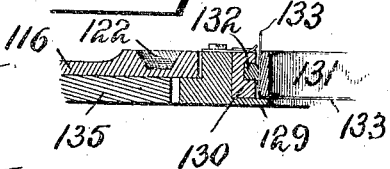

No. 875,626.
W. N. PARKES.
EMBROIDERY OR ORNAMENTAL STITCH SEWING MACHINE.
APPLICATION FILED DEC. 8, 1905.
PATENTED DEC. 31, 1907
17 SHEETS—SHEET 14.
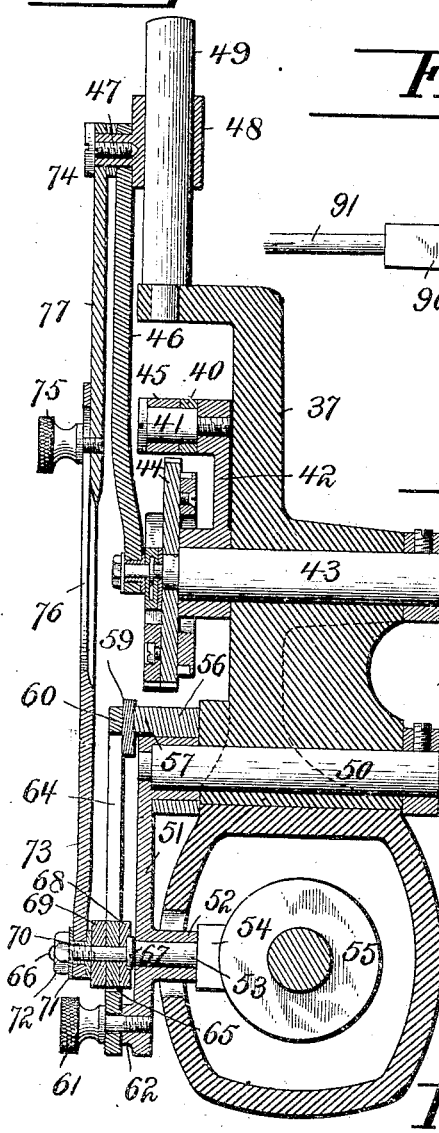
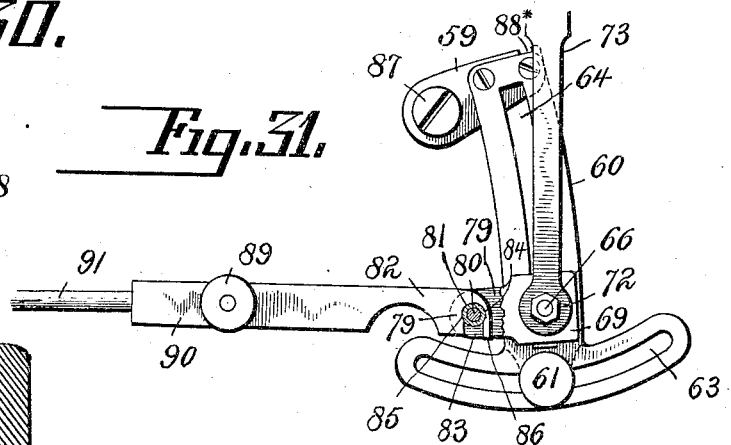
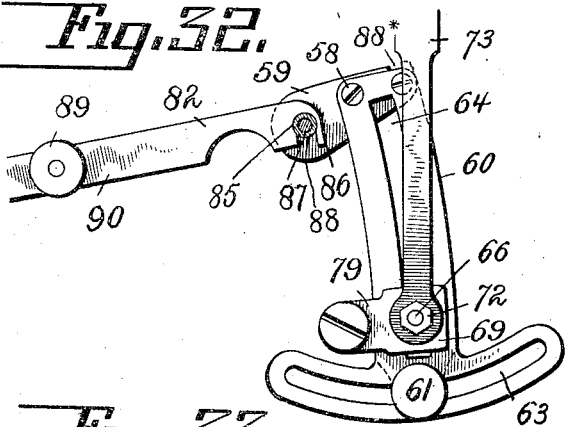
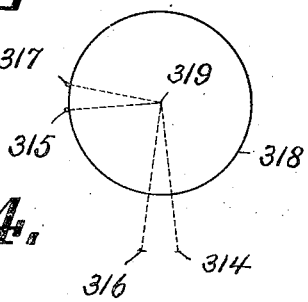
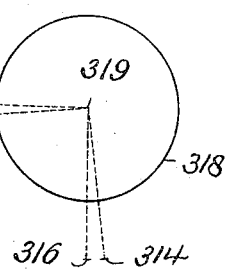
WITNESSES:
J. B. McGivr.
W. W. Ketchum
INVENTOR
William N. Parkes.

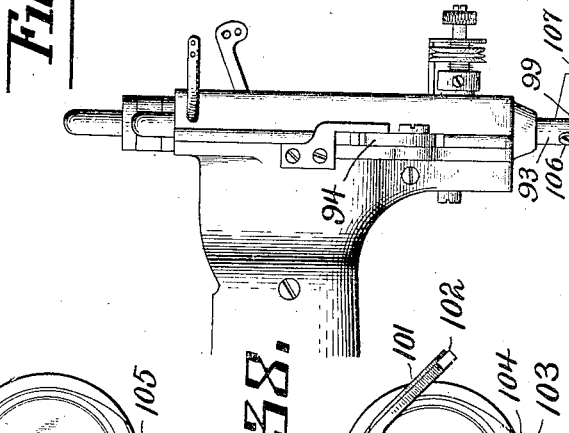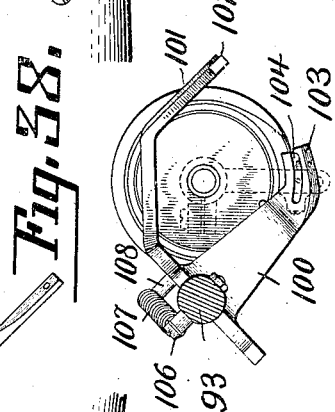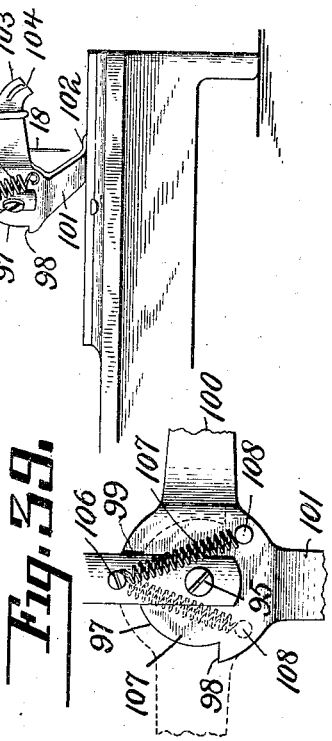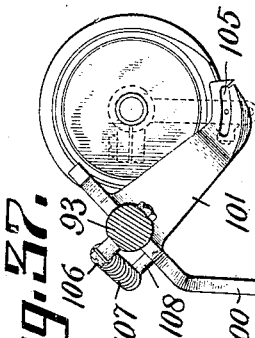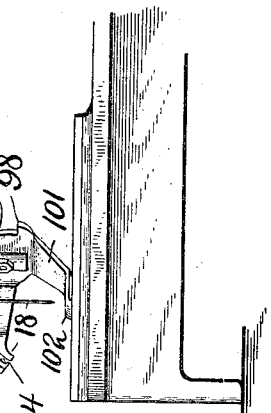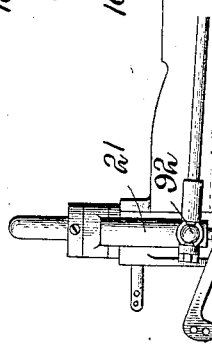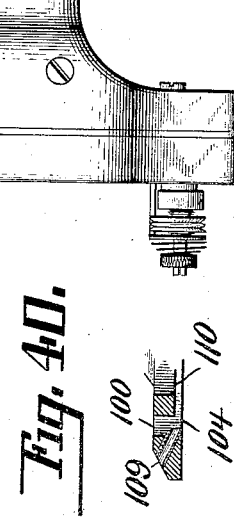

No. 875,626. PATENTED DEC. 31, 1907.
W. N. PARKES.
EMBROIDERY OR ORNAMENTAL STITCH SEWING MACHINE.
APPLICATION FILED DEC. 8, 1905.
17 SHEETS—SHEET 16.
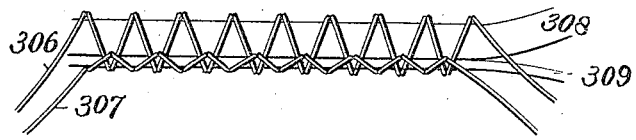
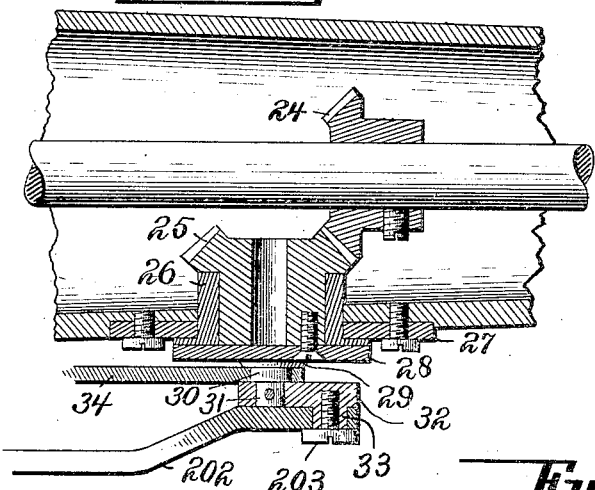
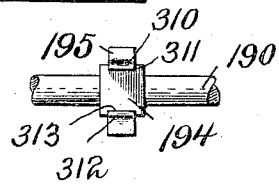
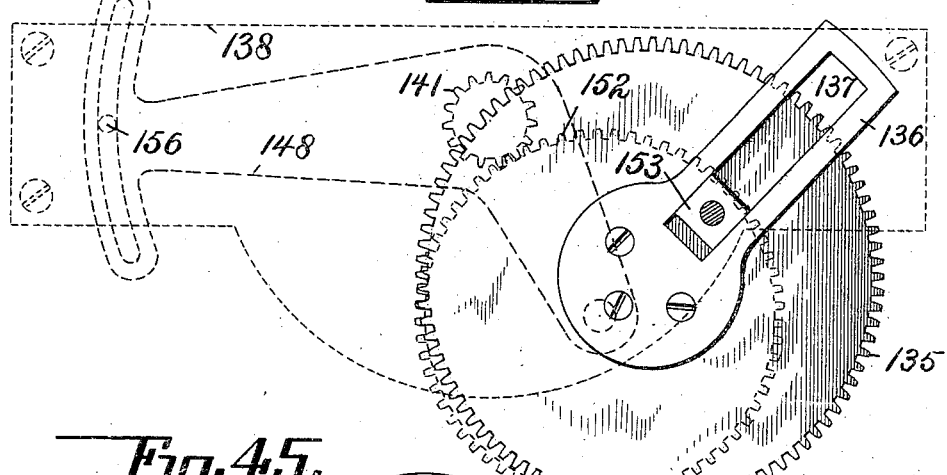
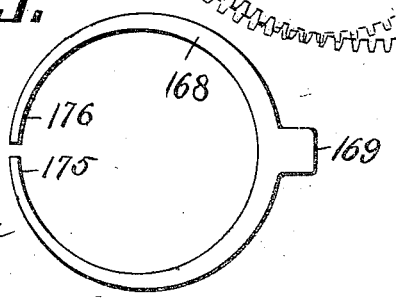
WITNESSES:
J. B. McGirr.
W. W. Ketchum.
INVENTOR
William N. Parkes.

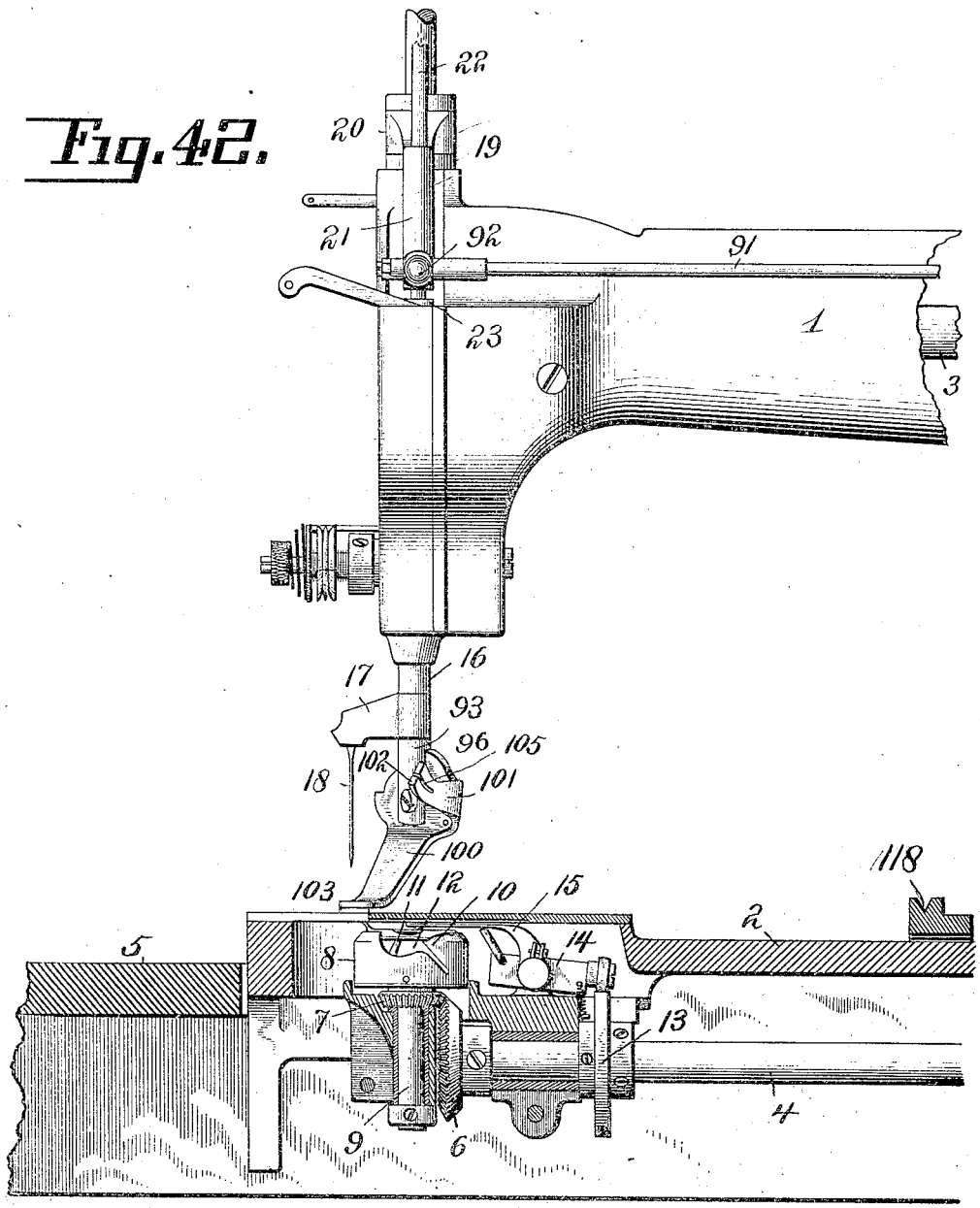

UNITED STATES PATENT OFFICE.

WILLIAM N. PARKES, OF BROOKLYN, NEW YORK.

EMBROIDERY OR ORNAMENTAL-STITCH SEWING MACHINE.

No. 875,626.  Specification of Letters Patent.  Patented Dec. 31, 1907.

Application filed December 8, 1905. Serial No. 290,945.

*To all whom it may concern:*

Be it known that I, WILLIAM N. PARKES, a citizen of the United States, residing in Brooklyn, county of Kings, and State of New York, have invented a new and useful Improvement in Embroidery or Ornamental Stitch Sewing-Machines, of which the following is a description.

This invention relates to sewing machines, and especially to the class known as embroidery or ornamental stitch machines.

June 26, 1900, and February 18, 1902, Patents Nos. 652,326, and 693,666, respectively on embroidery machines were issued to me. November 20, 1905, I filed an application, Serial No. 288,208, for a patent on an embroidery machine. These patents and the said application disclose my automatic embroidery machine, and various improvements in connection with the same.

The object of my present invention is to make various other improvements in this machine, and the invention consists of these various improvements, which will be disclosed in connection with the specification, and specifically set forth in the claims.

Figure 2:
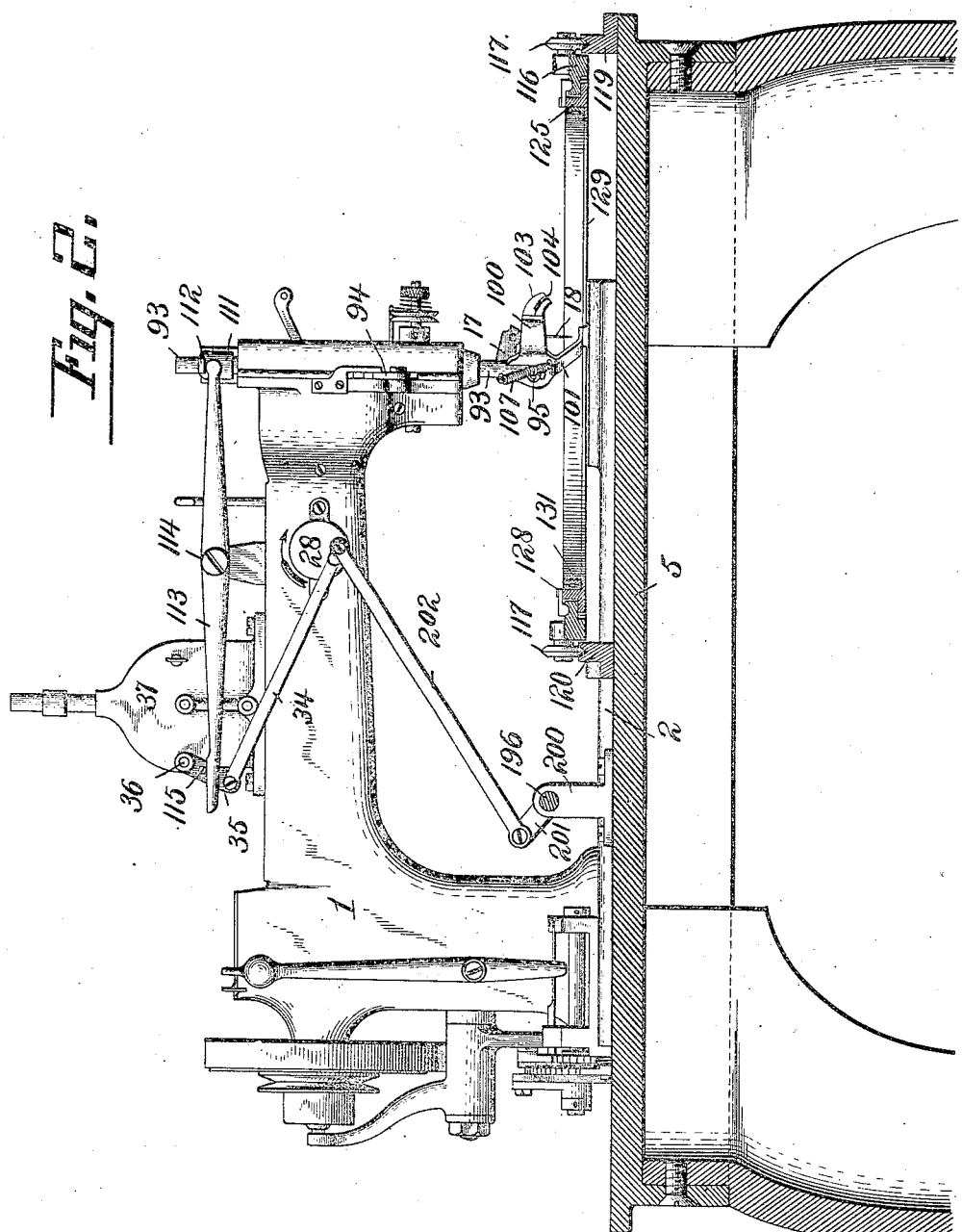
Figure 3:
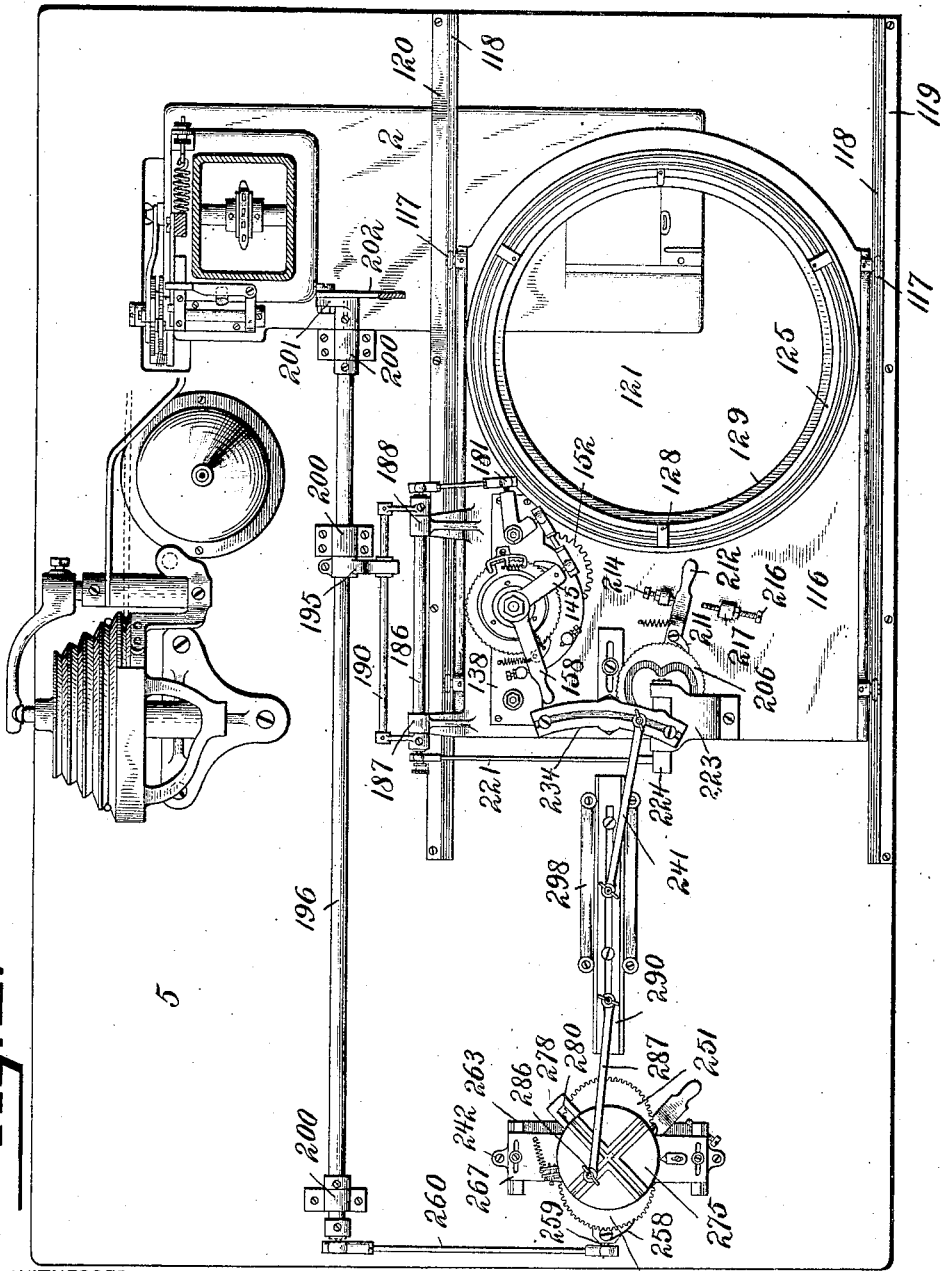
Figure 46:
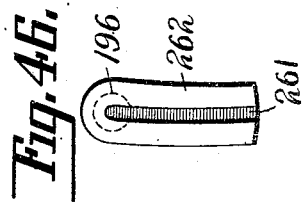
Figure 10:
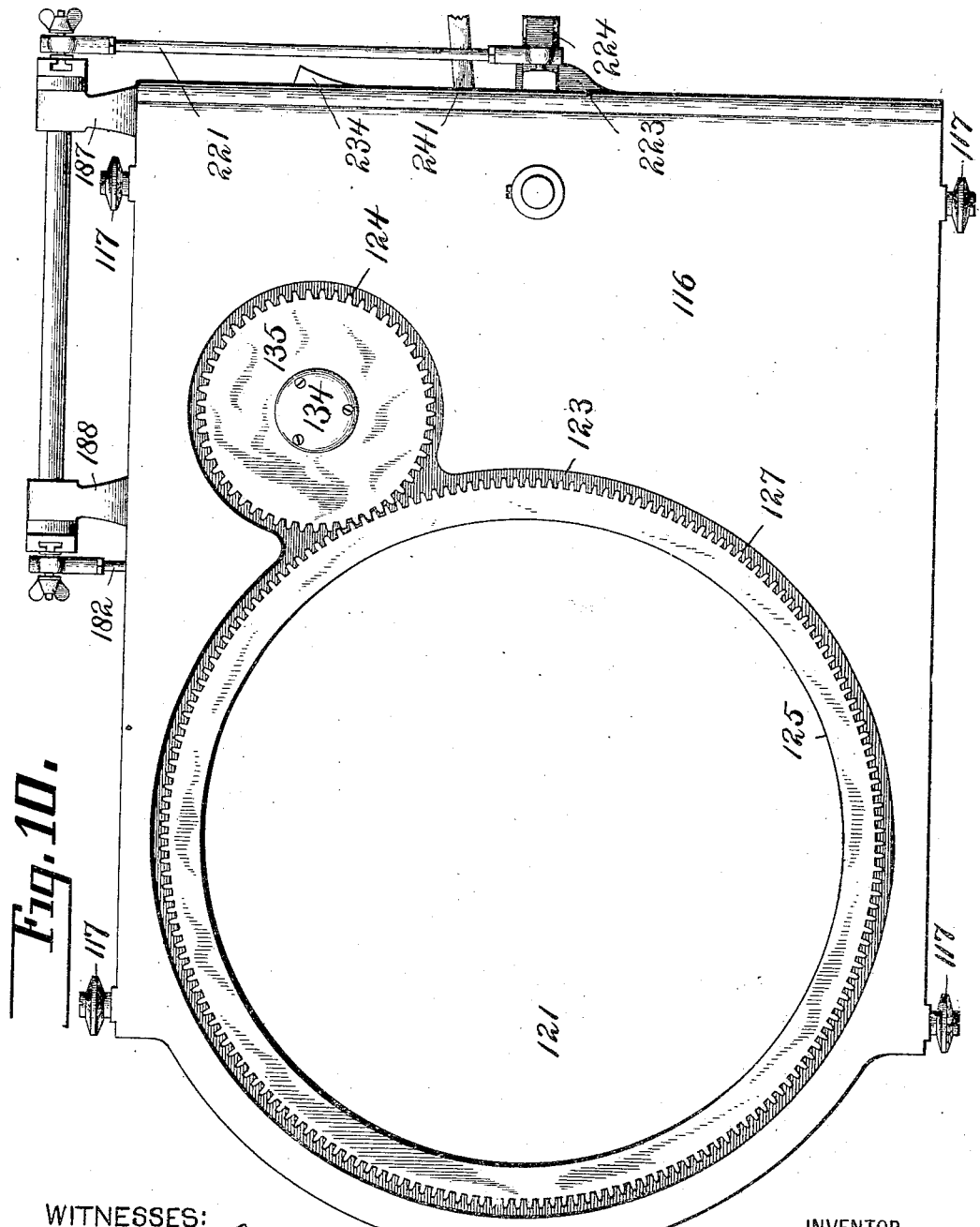
Figure 17:
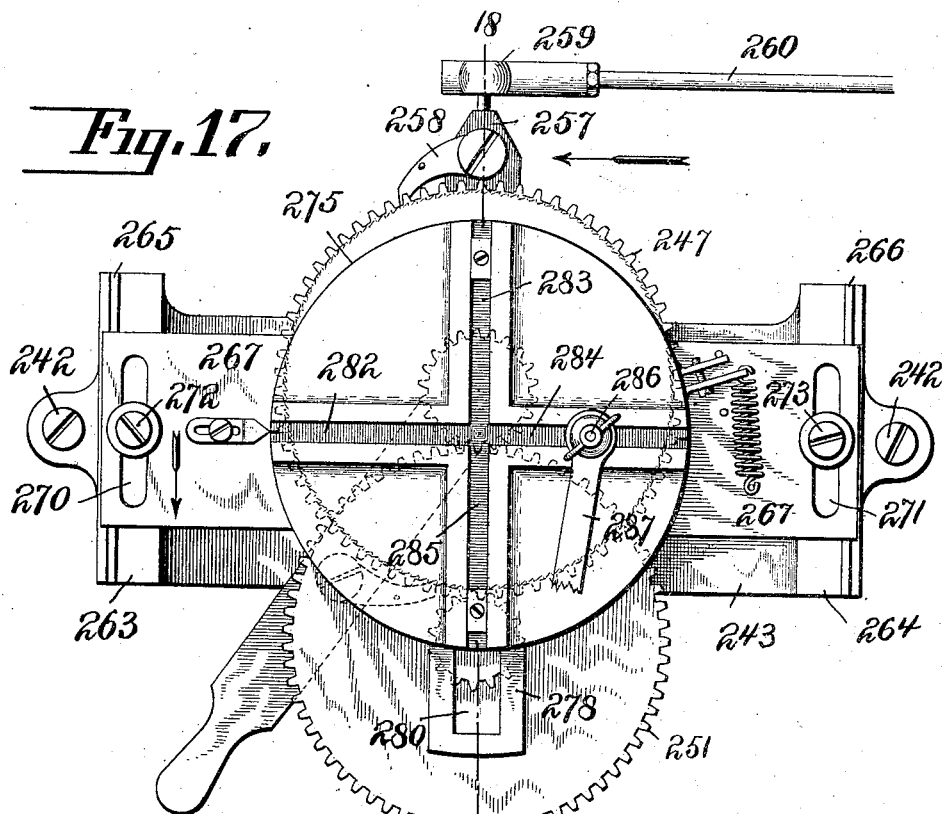
Figure 18:
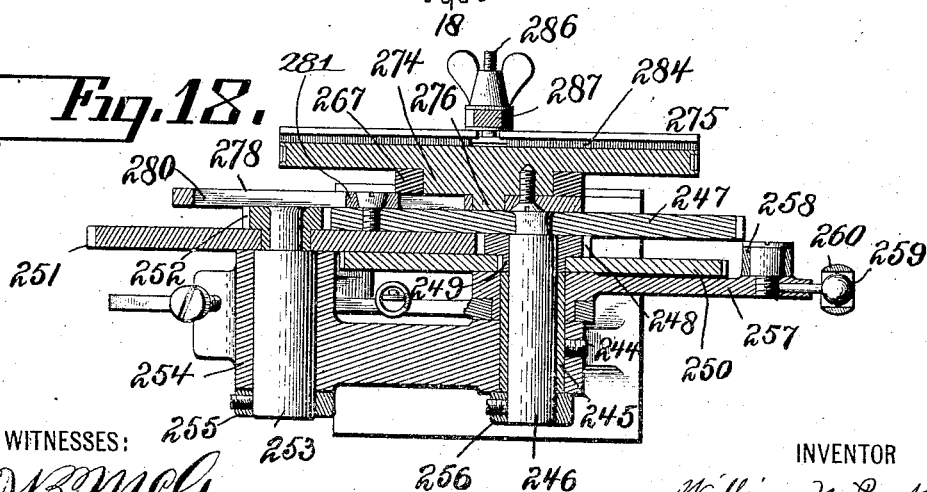

Referring now to the drawings: Figure 1 is a front elevation, and Fig. 2 a rear elevation of the machine, and Fig. 3 is a top plan view, the arm being omitted to show the relation of parts under the same. Fig. 4 is a top plan view of the work carrier and carriage, and the mechanism carried by the same. Fig. 5 is an enlarged detached top plan view of the mechanism for revolving the work carrier; Fig. 6 is a vertical cross sectional view taken on lines 6—6, Fig. 5, and Fig. 7 is a like view taken on lines 7—7, Fig. 5. Fig. 8 is a bottom plan view of the revolving work carrier operating mechanism bridge showing the parts carried by the same, and Fig. 9 is a plan view exposing the parts operated by the mechanism carried by the bridge. Fig. 10 is a bottom plan view of the work carrier carriage exposing the work carrier rack and the gear wheel that engages the same. Fig. 11 is a detached detail plan view of the mechanism carried by the carrier for reciprocating the same, and showing the connection between the said carrier and the intermediate slide. Fig. 12 is a like view, showing the cam and the parts operated by it in reversed position. Fig. 13 is a sectional detail view on lines 13—13 of Fig. 12. Fig. 14–15 and 16 are details in connection with the operating cam ratchet. Fig. 17 is a detached top plan view of the compound mechanism for reciprocating the work carrier, and Fig. 18 is a detail sectional view taken on lines 18—18 of Fig. 17. Fig. 19 is a bottom plan view of the bridge of the compound mechanism showing the part carried by the same, and Fig. 20 is a top plan view of the parts under the bridge that drives the parts carried by the bridge. Figs. 21 to 25 inclusive are details showing the construction of the intermediate slide and connecting devices through which the movement of the compound mechanism is transmitted to the work carrier carriage. Fig. 26 is a top plan view of a part of the driving mechanism that operates the mechanism carried by the work carrier carriage, and Fig. 27 is a sectional view of the same on lines 27—27, Fig. 26, looking in the direction of the arrow in said figure. Figs. 28 and 29 are sectional details showing the construction of the work carrier, and the manner in which it is carried by the work carrier carriage. Fig. 30 is an enlarged sectional detail on lines 30—30, Fig. 1. Fig. 31 shows the end of the needle-bar connection on the needle-bar operating lever below the fulcrum of the same, and Fig. 32 shows the end of said connection above the fulcrum of said lever. Figs. 33 and 34 are diagrammatic views illustrating a detail. Figs. 35 to 40 illustrate the double presser foot, and the structure and manner of operating the same. Fig. 41 is a diagrammatic view showing the interlocking of the stitches along the edge of the design. Fig. 42 is a front side view of a part of the machine, the base being in section to expose the looper mechanism. Fig. 43 is a view showing the manner in which the power is transmitted from the driving shaft to the needle positioning mechanism. Fig. 44 illustrates the means of adjustment to increase and decrease the speed of rotation of the work carrier. Fig. 45 is a detail in connection with the friction device. Fig. 46 is a detail in connection with the transmission of the power from the driving shaft to the work moving mechanism.

In the drawings, 1 indicates the arm of the machine, 2 the base, 3 the upper or driving shaft, 4 the lower or looper shaft, and 5 the table on which the head and the work moving mechanism is mounted.

The lower shaft 4 is driven, by means not shown, from the movement of the driving shaft, and revolves in unison with said driving shaft. In practice, I prefer to drive the lower shaft by means of a chain, as shown in my copending application, Serial No. 178,629, ornamental stitch machine, filed October 26, 1903.

To the forward end of the shaft 4 is secured a gear wheel 6 which is in engagement with a gear wheel 7, the latter being one half the diameter of the former. The gear wheel 7 is secured to the under side of a looper 8 that is carried by the upper end of a short vertical shaft 9. On the looper 8, is formed a beak 10 that is adapted to engage the needle thread loop, and in combination with an auxiliary hook 11, pass the same around a bobbin case 12 that is carried by the hook 8. (Fig. 42.) This looper mechanism is the same as shown and described in my copending application, Serial No. 277,774, filed September 9, 1905, looper mechanism for sewing machines.

On the shaft 4 is secured a bobbin controller cam 13, which engages with the outer end of a lever 14 that carries a bobbin controller 15, that is adapted to engage in a suitable manner the bobbin and thereby control the same. This bobbin controller mechanism is the same as shown and described in my copending application, Serial No. 288,208, filed November 20, 1905, automatic embroidery or ornamental stitch machine. In practice, when the machine is to be run at a very high rate of speed, the bobbin controller shown and described in my copending application, Serial No. 154,457, filed April 27, 1903, is used.

In suitable bearings in the forward end of the arm of the machine is journaled to reciprocate and oscillate, a needle-bar 16, that carries a needle-holder 17, in which is secured a needle 18. The axis of the needle-bar is coincident with the axis of the hook or looper shaft 9. On a suitable bearing 19 that is secured to the top of the forward end of the machine, is pivoted a lever 20 which has a downwardly extending part 21, in which is adapted to reciprocate a rod 22, that is carried by the outer end of an arm 23. The arm 23 is secured to the needle-bar by means not shown, and the needle-bar is reciprocated by means, not shown, operated by the forward end of the driving shaft of the machine.

The parts in connection with the needle-bar which reciprocate it and permit it to be oscillated are fully shown and described in my copending application, filed November 20, 1905, Serial No. 288,208.

It will now be understood in connection with the needle-bar and its operating parts, that when the arm 21 is oscillated, the needle-bar is moved laterally, and through this movement, the needle is moved laterally. The axis of the needle-bar being coincident with the axis of the hook, it is of course, understood that the needle moves laterally in a path that is concentric with the path of the beak 10 of the hook.

The means by which the needle is moved laterally, will now be described.

On the driving shaft of the machine, is secured a gear wheel 24, which engages and operates a gear wheel 25, the hub of which is journaled in a bushing 26. The said bushing is secured to a plate 27, that in turn is secured to the rear side of the arm of the machine. To the end of the hub of said gear 25, is secured a disk 28, that carries a crank pin 29, on which is formed reduced portions 30 and 31. To the reduced portion 31 is secured a part 32 on which is formed a crank or wrist pin 33.

One end of a pitman 34 is pivoted on the reduced portion 30 of the crank pin 29, and the other end of said pitman is connected to the outer end of an arm 35. The arm is secured to the rear end of a shaft 36, (Fig. 2), which latter is journaled in a bracket 37 that is secured to the top of the arm of the machine. To the forward end of said shaft, is secured an arm 38, (Fig. 1), in the face of which is a way 39, that extends over the axis of the shaft 36. In said way is adjustably secured one end of a link 40, that at its other end is pivoted on a stud screw 41. The stud screw has a seat in the outer end of a pawl lever 42, that is pivoted on a shaft 43, and the shaft is journaled in the bracket 37. To the forward end of said shaft, is secured a ratchet wheel 44, and on the bearing or screw 41, is pivoted a pawl 45 that is in engagement with said ratchet wheel. The lower end of a link 46 is adjustably secured in a way formed in a projection that is located on the side of the ratchet wheel 44. This way runs over the axis of the ratchet wheel shaft 43, so the end of the link 46 may be adjusted over the axis of said wheel, and the movement of the link from the movement of the ratchet wheel thereby arrested. The upper end of the link is pivoted on a bearing 47 that projects horizontally from a part 48, which latter is adapted to slide on a post 49, and the post has a seat in the bracket 37. (Fig. 30.)

It will be now understood that the ratchet wheel 44 may be rotated by the parts that have been described, and that when the said ratchet wheel is rotated, the part 48 may be reciprocated.

On the forward end of a short shaft 50, which is journaled in the bracket 37, is secured one end of a lever 51. On the rear side of said lever, is formed a boss 52, in which is journaled the stem 53 of a shoe 54, which is in engagement with a switch cam 55, carried by the driving shaft of the machine. On the hub of the lever 51, is pivoted a part 56 on which is formed a boss 57. To the face of the boss is secured, by means of screws 58, a part 59 and the upper end of an inverted T shaped part 60. The lower end of the part 60 is secured by means of a thumb screw 61 to the face of a boss 62 formed on the lower end of the lever 51. The thumb screw passes through a slot 63 formed in the lower end of the part 60, and the thumb screw and slot serve as a means for adjusting the part 60 angularly about the axis of the shaft 50.

A way 64 is formed through the part 60, and in the said way is located to slide a shoe 65. A bolt 66 on which is formed a head 67 passes through the shoe 65, and on the said bolt back of the shoe is located a plate 68, and in front of the shoe a plate 69. Next to the plate 69 is located on the stud, a bushing 70, next to the bushing is a washer 71, and next to the washer a lock nut 72. (Fig. 30.) On the bushing 70 is pivoted the lower end of a two part connection 73, the upper end of said connection being pivoted on the bearing 47 of the part 48, and retained thereon by a screw 74. A thumb screw 75 which passes through a slot 76 formed in the two part connection, and which has a seat in the part 77 of said connection, serves as a means for adjustably increasing or decreasing the length of said connection, and thereby changing the location of the shoe 65 in the way 64.

By means of the bolt 66 and the lock nut 72, the shoe 65, the plates 68 and 69, and the bushing 70 are rigidly clamped together. The shoe is of sufficient thickness to just keep the plates into sliding contact with the sides of the part 60.

In extending ends 78 and 79 of the plates 68 and 69, is secured a pin 80, and intermediate the plates on said pin is an anti-friction roller 81. (Fig. 31.) The end 82 of a two part connection has formed in it a way 83, as shown in Figs. 31 and 32. In the inner walls of said way, is formed indents 84 and 85. The end 86 is sufficiently yielding to permit the end 82 to be pressed on the roller 81 until it is in the position shown in Fig. 31. The spring portion 86 and the indents 84 and 85 serve as a means for retaining the end 82 in position and clamping the same on the roller 81. On a shouldered screw 87 is located an anti-friction roller 88, (Fig. 32), that is of the the same diameter as the roller 81. The screw 87 is seated in the part 59, and said part is made adjustable by means of a slot 88* that is formed in the same, and the screws 58, one of which passes through said slot into a seat in the boss 57.

The part 59 is so located, and the slot 88* is of a sufficient extent, to permit said part to be adjusted so that the screw 87 will be the desired extent above the axis of the pivot of the lever 51, for the purposes which will be explained in connection with the general explanation of the operation of the machine.

In adjusting this part 59, the screws 58 are loosened and the part is adjusted around the screw 58 that is not in the slot 88*, serving as a pivot for said part in making the adjustment. After the adjustment is made, the part 59 is of course, again secured in position by the screws 58.

By a thumb screw 89, the parts 90 and 91 are, in a suitable manner, adjustably connected. The forward end of the part 91 of this two part connection is pivoted at 92 to the arm 21.

It is now to be understood that the lever 51 is oscillated by the switch cam 55, and that through the connection between said lever and the arm 21, said arm is oscillated, and as before explained, when this arm is oscillated, the needle-bar is oscillated, and thereby moved laterally.

In machines of this character, it is desirable at times to have the use of more than one presser-foot. Also in various other machines, it is advantageous to change from one kind of a foot to another. In my present invention, I have provided a double presser foot, and means by which either one of said presser feet may be brought into action instantly by simply pushing the other one out of action. This presser foot will now be described.

In suitable bearings (not shown) in the forward end of the arm of the machine, is located a presser-bar 93. This presser-bar is depressed in a usual manner by a usual presser-bar spring, not shown. This presser-bar is lifted manually against the action of the presser-bar spring by a usual presser-bar lifter 94.

In the lower end of the presser-bar, is provided a slot, and a shouldered screw 95 passes through said slot, and is secured in the presser-bar. In said slot and on the shoulder (not shown) of the screw, is pivoted a double presser foot 96, which is provided with a radial hub 97, that terminates into abutments 98 and 99. This hub is provided with presser foot shanks 100 and 101, which terminate at their ends, into presser feet 102 and 103. In the presser feet, are needle slots 104 and 105 of sufficient length to permit of the passage of the needle in the different lateral positions of the same. To the presser-bar at 106, is secured the upper end of a spring 107, the lower end of which is connected at 108 to the hub of the presser foot.

In the presser foot 100, is located a tube 109, the end of which extends into the needle slot 104. Back of the needle slot 104, the face of the presser foot is cut away, as at 110 to permit of the passage of the embossed embroidery stitches.

In Fig. 39, the hub of the double presser foot is shown in one position in full lines, and the other position in dotted lines. The normal tendency of the spring 107 is to hold the foot in either one of these positions as will be clearly understood by reference to said Fig.

39. In changing from one to the other of said presser feet, the presser foot is of course, lifted from the work. Then the foot is turned on its hub until the pin 108 is just by a vertical line passing through the axis of the pivot 106 of the spring 107 and the center of the point 108, after which the spring rapidly pulls the foot into its changed position in contact with one of its abutments. The normal tendency of the usual pressure of the presser-bar spring, when either one of the presser feet is in engagement with the work, is to press the foot in the same direction that the spring 107 normally draws it. It will thus be understood that this double presser foot is securely held in either one of its two positions. The slot in the presser-bar in which the hub of the foot is located, is just wide enough to permit of the free movement of the hub, and the extending portion of the hub from its axis 95 to its periphery, serves as a lateral bearing for the hub.

In machines of this character in which the work is carried in a carrier in an extended position, it is desirable that the presser foot should be lifted from the work when the work is moved. The means provided for performing this function, will now be described.

In my copending application, No. 288,208, filed November 20, 1905, automatic embroidery or ornamental stitch sewing machine, the presser foot is lifted from the work by means of an eccentric, and a connection between the same and the presser-bar. In my present machine, a moving part of the needle positioning mechanism is used for lifting the presser foot from the work.

To the upper end of the presser-bar 93, is secured a part 111, on which is formed an extending lug 112. The forward end of a lever 113, which is pivoted at 114, is adapted to engage said lug, as shown in Fig. 2. A pin 115, on which there is an anti-friction roller, (not shown), is carried by the arm 35, and is adapted to engage the end of the lever 113, as will be understood by reference to Fig. 2.

The movement of the parts by means of which the arm 35 is oscillated, are so timed that the lever 113 is operated, and the presser foot lifted from the work just previous to the movement of the latter.

The work carrier, the work carrier carriage, and the means adapting the carrier to revolve on the carriage, will now be described.

A work carrier carriage 116 is provided with wheels 117, which are adapted to reciprocate in grooves 118 formed in tracks 119 and 120. In said carriage, is formed a round opening 121, and a circular groove 122 is formed adjacent to the edge of said opening. Around the opening on the under side of the carriage, is a recess 123, which extends out into a second recess 124. (Fig. 10.) In said opening 121, is located a work carrier rack 125, on the outer wall of which is formed a flange 126. (See Fig. 7.) On the said flange are teeth 127. The flange 126 extends into the recess 123, and this recess serves as a housing for the teeth of the rack. To the top of the rack, are secured bearing parts 128, which are adapted to slide in the groove 122, as shown in Fig. 7. The work carrier rack is provided with an inwardly extending flange 129, and on this flange is located clamping rings 130 and 131. (Fig. 29.) The outer ring 130 is provided with a groove in which is located a frictional substance 132. The work 133 is clamped between these rings, as shown in Fig. 29, and is held extended across the opening 121 by this means.

The rack 125 and the clamping device for the work, constitute the work carrier, and the opening 121; the groove 122 and the bearings 128 are the means which adapt the work carrier to revolve on the carriage.

The means for revolving the work carrier, will now be described.

In the work carrier carriage, is secured a bushing or sleeve 133, in which is journaled a hub 134 of a gear wheel 135, the teeth of which are in engagement with the teeth of the work carrier rack. To the upper end of the hub 134 is secured an arm 136, in which is formed a slot or way 137. A bridge 138 is suitably secured to abutments or supports at its ends, and in said bridge, is secured a sleeve 139. In this sleeve, is journaled a shaft 140, on the end of which is formed a toothed flange 141. The upper end of the shaft 140 is reduced as as 142, and on said reduced portion, is secured a ratchet wheel 143. Next above said ratchet wheel, is a sleeve 144, and on this sleeve is pivoted a pawl lever 145, on which is formed a hub 146. The pawl lever carries a pawl 147, which is adapted to engage the teeth of the ratchet wheel. A bell crank lever 148 is pivoted on the sleeve 139, a collar 149 serving as a means for retaining the same on the sleeve. In one end of the bell crank lever, is secured a shouldered screw 150, on which is formed a large head 151. On the body of the screw 150, is journaled a gear wheel 152, which is in engagement with the toothed head of the shaft 140. To the under side of the gear wheel 152, is suitably pivoted a shoe 153 that is in engagement in the slot 137 with the arm 136. The outer end of the bell crank lever 148 has an extended head 154, as shown best in Fig. 8. In said head, is formed a circular shaped slot 155, which runs concentric with the axis of the shaft 140. A bolt 156 that passes through the slot 155, and on the upper end of which is a lock nut 157, serves as a means for rigidly securing the bell crank lever to the bridge 138.

As the slot 155 is concentric with the axis of the shaft 140, it will be understood that this slot permits of the adjustment of the lever around its axis. And as the axis of the lever is concentric with the axis of the toothed head 141, it will be understood that when the lever is adjusted around on its axis, the gear wheel 152 is moved around the axis of the toothed head 141, and that this adjustment does not disturb the engagement between the toothed head and the gear wheel. The object of this adjustment is for the purpose of changing the axis of the wheel 152 relative to the wheel 135, and thereby vary the speed of rotation of the work carrier.

On the hub 146 of the pawl lever 145, is pivoted a stop pawl lever 158, which carries a stop pawl 159. A spring 160 is at 161 attached to the bridge, and at 162 to the stop pawl lever 158. In a lug 163, which is located on the bridge 138, is adjustably secured an abutting screw 164, and in a lug 165, which is also located on said bridge, is adjustably located a limiting screw 166. The normal tendency of the spring 160, is to draw the lever 158 into contact with the end of the screw 164.

The object of the adjustable stop screw 164, is to adjustably locate the nose of the stop pawl relative to the teeth of the ratchet wheel, so that the stop pawl will just drop in a tooth when the actuating pawl finishes its forward or operating stroke. And the object of the adjustable screw 166, is for the purpose of predetermining the extent that the lever 158 may be moved to the end, that the ratchet wheel may be manually moved forward a measured distance at each stroke of said lever.

On the upper side of the ratchet wheel 143, is secured a bearing 167, on which is suitably mounted and retained thereon, a friction ring 168, which has an extending end 169. To said extending end is secured one end of a spring 170, and the other end of said spring is attached at 171 to an extending end of a bracket 172, which latter is secured to the bridge 138. On the said bracket, is formed arms 173 and 174, and the part 169 of the friction ring is located between said arms. The tendency of the spring 170 is to draw the extending part 169 of the ring, into contact with the arm 173. The friction ring is tapered towards the ends 175 and 176 of the same, and is made so that it yieldingly clamps the bearing upon which it is located.

The friction between the friction ring and the bearing upon which it is located, is of such an extent that when the ratchet wheel is operated, the ring is carried forward with the wheel, so that the part 169 is out of contact with the arm 173. The tension of the spring 170 is sufficient to overcome the friction between the ring and its bearing, before the part 169 reaches the arm 174.

It is therefore to be understood, that when the ratchet wheel is operated, the spring 170 yieldingly holds the wheel from being thrown ahead, or if it is thrown ahead less than the extent of a tooth, draws it back into contact with the stop pawl. This insures an accurate feed from the movement of the ratchet wheel, and movement of the wheel and mechanism operated by it forward from a given point, at each stroke of the operating pawl.

To the outer end of the pawl lever 145, is pivoted one end of a link 177, the other end of said link being connected at 178 to a bell crank lever 179, which is pivoted at 180 to the bridge 138. To the other end of said bell crank lever, is connected at 181, one end of a link 182. The other end of the link or connection is at 183, adjustably secured in a way 184 formed in an arm 185, that is secured to one end of a shaft 186. The shaft is suitably journaled in bearings 187 and 188 that extend from the carriage 116.

The arm 185 extends downwardly from said shaft, and the way in the arm, extends over the axis of the shaft, so the end of the connection 182 may be adjusted over the axis of the shaft, and movement of said connection thereby arrested. From the base of the arm 185, extends horizontally a second arm 189, in the outer end of which is secured one end of a round bar 190. The other end of said bar 190 is secured in the outer end of an arm 191, the base of which is secured to the other end of the shaft 186. From the base of the arm 191, extends downwardly an arm 192, (Fig. 4), in which is formed a way 193. Arms 191 and 192 are substantially the same as arms 185 and 189. The bar 190 is parallel with the shaft 186. On the bar 190, is mounted a shoe 194, which is engaged by one end of a forked lever or arm 195, as best shown in Fig. 27. The forked lever is clamped to a shaft 196 by means of ears 197 and 198, and a screw 199 which passes through ear 197 and has a seat in ear 198, as shown in Figs. 26 and 27. The shaft 196 is suitably journaled in standards 200, which are secured to the table 5 of the machine. To the forward end of the shaft 196, is secured an arm 201, (Fig. 2), to the outer end of which is pivoted the lower end of a pitman 202. The upper end of said pitman 202 is pivoted on the crank pin 33, and a screw 203 serves as a means for retaining the same on the pin.

The double crank 31 and 33, carried by the disk 28, is for the purpose of properly timing the action of the pitman 202 relative to the pitman 34. The disk 28 revolves in the direction of the arrow. (Fig. 2.) The crank pin 29 is sufficiently ahead of the crank pin 33, to cause the arm 35 to move in unison with the arm 201.

By means that have now been described in connection with the work moving mechanism, the shaft 196 is oscillated, and this oscillation of said shaft of course, oscillates the arm 195, that is carried by it. The fork end of the arm 195 being in engagement with the shoe 194, which is pivoted on the bar 190, when the arm is oscillated, the bar is oscillated, and as the ends of the bar are secured in the arms 189 and 191 carried by the shaft 186, when the bar is oscillated, said shaft is oscillated. By the connection between the arm 185 and the pawl lever 145, the latter is actuated from the movement of said arm, and by the means intermediate said ratchet wheel and the work carrier rack, the latter is revolved from the movement of the ratchet wheel. The adjustment in this mechanism for revolving the work carrier so that the rotary speed of the same is varied, will be explained in the general explanation of the workings of the machine.

In this machine, the work carrier carriage is given what I call a primary reciprocating movement, and a secondary reciprocating movement. The means provided for giving said carriage the primary reciprocating movement, will now be described.

In a bore which passes through the carriage 116, is secured a bushing 204, in which is journaled a shaft 205, to the upper end of which is secured a ratchet wheel 206. A flange 207 is formed on the bushing 204, and next above said flange on the bushing, is pivoted a stop pawl lever 208. On the upper side of the stop pawl lever, is formed a boss 209, in which is located a shouldered screw 210, on which is pivoted a stop pawl 211, that is, by suitable means, held into engagement with the teeth of the ratchet wheel 206. This stop pawl lever is provided with a handle 212. The lever by means of a spring 213, is normally held into engagement with an adjustable screw 214, which is suitably secured in an ear 215, extending upwardly from the carriage. An adjustable limiting screw 216 is also suitably secured in an ear 217, extending upwardly from the carriage. This stop pawl 211 is adapted to be adjusted, and manually operated a measured extent for the same purposes as explained in connection with the stop pawl 159.

Next above the stop pawl lever on the bushing 204, is pivoted a pawl lever 218, that carries a pawl 219, which is held in a suitable manner into engagement with the teeth of the ratchet wheel 206. To the end of the stop pawl lever, is pivoted at 220, one end of a connection rod 221. The other end of the said connection rod is adjustably secured in the way 193 formed in the arm 192, that extends downwardly from the base of the arm 191. In the top of the ratchet wheel 206, is formed a cam groove 222.

In a bracket 223, that is secured to the carriage 116, is suitably located to slide a plate 224, which carries on its under side a stud 225, and on the stud is pivoted an anti-friction roller 226, that is in engagement with the cam groove 222 of the ratchet wheel. On the top of the slide is a boss, or raised portion 227 is formed, and in the said boss, is formed a way 228, which extends across the slide. A bracket 229 is secured to the carriage 116 by means of a screw 230, which passes through a slot 231 that is formed in the bracket. On the bracket, is an upwardly extending part 232, in which is suitably pivoted at 233 a lever 234, that is adapted to oscillate in a horizontal plane. In the upper side of said lever, is formed a way 235, that extends across the axis 233 of the lever, and from one end to the other of the same. In the way, is adjustably located stops 236 and 237, and on the said stops are formed indicating points 238 and 239, as shown in Fig. 11. In the way 225, is adjustably secured by means of a thumb screw 240, one end of a connecting bar 241.

Assuming now that the other end of the connection bar 241 is secured to a fixed part of the machine, and the ratchet 206 is operated, it will be understood that the lever 234 will be oscillated on its pivot, and that through this oscillation, the work carrier carriage will be reciprocated. It is also to be understood, that if the end of the connection 241 is adjusted over the pivot 233 of the lever 234, there will be no movement of the connection from the oscillation of the lever, and therefore no reciprocation of the carriage from this source.

The means provided for giving the carriage a secondary reciprocating movement, will now be described.

To the table 5 of the machine is secured, by means of screws 242, a bracket 243. In the bracket is secured, by means of screw 244, a bushing 245, and in the said bushing is journaled a shaft 246, to the upper end of which is secured a gear wheel 247. On the shaft intermediate the gear 247 and the bushing 245, is mounted a small gear 248, on which is formed a hub 249, and on this hub is secured a ratchet wheel 250. The gear 248 is in engagement with a gear 251 that is mounted on the hub of a small gear 252. The gears 251 and 252 are secured to the upper end of a shaft 253, which is journaled in a bearing 254 that is integral with the bracket 243. The small gear 252 is in engagement with the gear 247. Collars 255 and 256 serve as means for retaining the shafts 253 and 246 in their respective bearings.

It will now be understood that if the ratchet wheel 250 is revolved, it will carry with it the gear 248, that this gear will revolve gear 251 which carries with it gear 252, and that by reason of the engagement between this gear and the gear 247, the latter will be revolved. As the gear 247 revolves, the shaft 246 is revolved in the opposite direction to that in which the ratchet wheel 250 and the gear 248 revolves. This compounding of these gears is for the purpose of revolving the gear 247 very slowly. It is from the movement of this gear that the means which give the secondary reciprocating movement to the work carrier carriage, is driven.

On the sleeve 245 next below the ratchet wheel 250, is pivoted a pawl lever 257, on the outer end of which is pivoted a pawl 258, that is in engagement with the ratchet wheel 250. At 259, is pivoted to the end of the pawl lever, one end of a connection rod 260. The other end of said rod is adjustably connected in a way 261, formed in an arm 262 that is attached to the rear end of the shaft 196. The way extends over the axis of the shaft 196 so that the end of the connection may be adjusted over the same, and movement of the mechanism operated from this arm thereby arrested.

On the bracket 243, are upwardly extending bearings 263 and 264, on the face of which are formed tongues 265 and 266. A bridge 267 extends from one to the other of said bearings 263 and 264, and in the ends of said bridge are formed grooves 268 and 269, in which are located the said tongues. Slots 270 and 271 are formed transversely through the ends of the bridge, and through the said slots pass screws 272 and 273 which have a seat in the bearings 263 and 264, and which serve as a means for securing the bridge to the bearings.

The slots in the bridge 267 serve as a means for permitting it to be adjusted laterally, and the tongues 265 and 266 on the bearings and grooves 268 and 269 in the bridge, serve as a means for guiding the bridge as it is adjusted, and accurately retaining the same in alinement.

In the center of the bridge, is formed a hole in which is located a hub 274 formed on the under side of a disk 275. On the under side of said hub, is a reduced portion 276 on which is centered the base 277 of an arm 278. The base of said arm is secured to the hub of the disk by means of screws 279. In the arm 278, is formed a slot 280. The gear wheel 247 carries a shoe 281 that engages the slot 280 of the arm 278. On the top of the disk 275, are formed ways 282, 283, 284, and 285, that run to the center of the disk.

In the way 284, is adjustably secured by means of a thumb nut 286, one end of a connecting bar 287. The other end of the said connection is adjustably secured, by means of a thumb nut 288, in a way 289 that is formed in a slide 290. The slide is adapted to reciprocate between rollers 291, 292, 293, and 294, as shown in Figs. 21, 22, and 23. Rollers 291 and 292 are adapted to revolve on shouldered screws 296, which have seats in legs 297 that extend upwardly from a bracket 298 that is secured to the table 5 of the machine. Rollers 293 and 294 are journaled on eccentric studs 299, that are secured by means of screws 300 in legs 301 and 302 that extend upwardly from said bracket.

In the way 289, are adjustably secured stops 303 and 304, and between said stops in said way, is adjustably secured the rear end of the connection bar 241.

It will now be understood that as the shaft 196 is oscillated, the ratchet wheel 250 is rotated, and this movement is transmitted to the disk 275 by means of the mechanism between the ratchet wheel and the disk. If the bridge 267 is adjusted so the axis of the disk 276 is concentric with the axis of the gear 247, then the rotary movement of the disk will be uniform. By adjusting the bridge so the axis of the disk is eccentric with respect to the axis of the gear 247, it is evident that the rotary movement of the disk will be varied. The slot 280 in the arm 278 permits of the lateral adjustment of the disk relative to the axis of the gear 247.

In Figs. 24 and 25, I have shown a modification wherein the slide 290 is reciprocated between shoes 305, as indicated in said figures.

The stop motion shown and described in my copending application serially numbered 288,208, filed November 20, 1905, may be used in my present machine.

To explain the general workings of this machine, it will now be assumed that it is desired to embroider a square figure, and that the diameter of the gear 135 relative to the diameter of the work carrier rack 125, is such that the gear revolves four times to each revolution of the rack. Under these conditions, if it is desired that the speed of the revolving movement of the work carrier be increased, as the carrier is moved so the stitching approaches the center of the same, and vice versa, the following adjustments are made. The extent of the stroke of the actuating pawl 258, and the extent of the stroke of the actuating pawl 147, are adjusted so the disk 275 revolves in unison with the gear wheel 152. Under this adjustment, the said disk will of course revolve in unison with the gear wheel 135. The end of the connection 287 is adjusted in the way 283, a sufficient extent from the axis of the disk 275, to reciprocate the work carrier carriage the distance of the altitude of an arc of 90 degrees, inscribed within the work carrier. For example referring to Fig. 4, the dotted line 450 is inscribed within the work carrier, lines 451 representing the sides of a square figure, and the dotted line 452 represent the altitude of said arc. The bridge 267 is adjusted in the direction indicated by the arrow in Fig. 17, until the eccentricity of the axis of the disk 275 relative to the axis of the gear 247, is such that the required change in the speed of the reciprocating movement of the carriage is produced. It is to be noted, that when the connection 287 is in the way 283, the disk 275 is at its maximum speed, when the stitching is being done farthest away from the center of the work carrier, and that at this point, the stitching is being done at the corner of the square design. When the lever 148 is in the position shown in Fig. 8, the axis of the gear 152 and the gear 135 are coincident, and when these parts are in this position, the work carrier will be revolved at a uniform speed. To change the speed of the revolving movement of the work carrier so as to increase and decrease the same, in proportion to the change in the location of the stitching to and from the center of the work carrier, the lever 148 is adjusted in the direction indicated by the arrow shown in Fig. 8. This adjustment separates the axis of the gear 152 and the gear 135, and this separation causes the shoe 153 to move towards the axis of the gear 135, and from the axis of the same, as the gear 152 is revolved. And this, of course, changes the speed of rotation of the gear 135, and through it, the speed of rotation of the work carrier. The angular position of the disk 275 is adjusted relative to the angular position of the gear wheel 152, so that the maximum speed of the rotation of the work carrier is reached when the stitching is nearest to the center of the same, and as said disk revolves in unison with said gear wheel, it of course follows that the minimum of speed in the carrier will be when the stitching is farthest away from the center of the same.

It is of course clear that if the work carrier rotates at a uniform rate of speed, the stitches will be closer together as the stitching approaches the center of the carrier. By means of the mechanism, the operation of which has just been described, the speed of rotation of the work carrier may be changed to compensate for the radial change in the location of the stitching, and the scope in the adjustments which have been described are such that this object may be accomplished. It is not to be understood that this is the only object of the change in the speed of rotation of the work carrier. By this element in this machine, many variations may be made in the designs that are automatically embroidered on the same.

In connection with the stitch forming mechanism, or rather the needle positioning part of the same, it is noted, that the roller 87 is so located that when the part 82 is connected to the same, it brings the needle in such a position that the stitching is located along the edge of the previously embroidered design, and as this roller is above the fulcrum of the lever 60, the time of the lateral movements of the needle is reversed. For example, referring to Fig. 41, suppose the stitches indicated by thread 306 in that diagrammatic view have been made, and in making these stitches the part 82 has been located on the roller 84. Now if the part 82 is adjusted on the roller 88, and a second row of stitches are made, the result will be that the stitches will be located as indicated by the thread 307 in said Fig. 41. The part 82 is located on the roller 84 for the purpose of making a narrow binding row of stitches along the edge of a design, and in shifting from below the fulcrum of the lever to a position above the same, it is now understood that the time of the lateral movement of the needle is reversed, and the stitches are interlocked as indicated in said Fig. 41. In practice, a filling cord 308 and a filling cord 309 is guided under these stitches along the edge of a design to give an embossed effect as shown in said Fig. 41.

Practically an endless variety of designs and stitches may be made on this machine. In making some of these stitches, it is desirable to use a tube to guide the filling material under the stitches, and to have the needle enter the goods on each side of said tube so as to fully cover the filling material without an undesirable extent of lateral movement in the needle. Then on the same design, it is at times desirable to automatically change the working position of the needle laterally, and also to automatically increase and decrease the extent of said lateral movement. It will be readily understood that if such a change is made in the lateral movement of the needle, the tube used for the filling thread would be in the way, and therefore the same would have to be removed. Instead of providing means for removing the tube, a double presser foot has been provided, as has been described. By this means, the presser foot which carries the tube, may be instantly changed to one that does not carry a tube. It is to be understood in connection with this presser foot, that at times, it is desirable to change the location of the working position of the needle laterally from one row of stitches to another, and to guide a filling cord under each row of stitches. In this event, each foot may carry a tube suitably located for the lateral change it is desired to make in the working position of the needle.

It is noted that the arm 195 is forked as before stated. The prong 310 of said fork is located in a way 311 formed in the top of the shoe 194, and prong 312 of said fork is located in a way 313 formed in the under side of said shoe, as best shown in Figs. 26, 27 and 46. This engagement between the fork and the shoe, permits, of course, the movement between the prongs of the fork and shoe longitudinally of the fork which is brought about by the oscillation of the fork about the axis of the shaft 196. And the prongs of the fork being located in said ways, prevents the shoe from moving longitudinally with the bar 190 as the said bar reciprocates with the work carrier carriage which carries the same.

Referring again to the needle positioning mechanism, it is noted in Fig. 33 the numeral 314 indicates the position of the arm 23 when the lever 51 is in the extreme of its movement to the right, or toward the rear end of the machine, and the numeral 315 indicates the position of the needle when the arm is in the said position. The reference character 316 indicates the position of the arm 23 when the lever 51 is in its extreme position to the left, and 317 indicates the position of the needle at this time. The path of the beak of the hook is indicated by the line 318, and the axis of the needle-bar and the hook 319. It is thus to be understood as before noted, that the needle moves in a path that is concentric with the path of the beak of the hook.

In Fig. 34 is indicated the movement of the arm and needle when the part 82 is connected to the part 59. It is to be noted in connection with this figure, that the needle enters the work at 315, in the same angular position as in Fig. 33, and that therefore the narrow binding stitch is brought to the edge of the embroidered design, as indicated in Fig. 41.

Having now described a preferred form of my invention what I claim as new is:

1. In a sewing machine, a work moving mechanism comprising means for revolving the work, means for automatically varying the speed of said movement of the work, and a stitch forming mechanism adapted to coöperate with said work moving mechanism.

2. In a sewing machine, a work moving mechanism comprising a revolving work carrier, means for automatically increasing and decreasing the speed of rotation of said work carrier a predetermined number of times during a rotation of the work carrier, and a stitch forming mechanism adapted to coöperate with said work moving mechanism.

3. In a sewing machine, a work moving mechanism comprising a revolving work carrier, means for automatically increasing and decreasing the speed of rotation of the work carrier, means for moving the work carrier laterally, and a stitch forming mechanism adapted to coöperate with said work moving mechanism.

4. In a sewing machine, a work moving mechanism comprising a revolving work carrier, means for moving said work carrier laterally a plurality of times during a rotation of the same, means for automatically increasing the speed of rotation of said work carrier, and a stitch forming mechanism adapted to coöperate with said work moving mechanism.

5. In a sewing machine, a work moving mechanism comprising a revolving and reciprocating work carrier, means for automatically varying the revolving and reciprocating movements of said work carrier, and a stitch forming mechanism adapted to coöperate with said work moving mechanism.

6. A sewing machine comprising a revolving work carrier, means for automatically varying the speed of said revolving work carrier, a stitch forming mechanism comprising a reciprocating needle adapted to be moved laterally, and means for moving said needle laterally a predetermined number of times relative to each variation in the speed of the movement of the work carrier.

7. A sewing machine comprising a revolving work carrier, means for automatically increasing and decreasing the speed of rotation of said revolving work carrier, a stitch forming mechanism comprising a reciprocating and laterally moving needle, and means for automatically changing the amplitude of the lateral movement of the needle a predetermined number of times during an increase and decrease in the speed of rotation of the work carrier.

8. A sewing machine comprising a revolving work carrier, means for reciprocating said work carrier means for automatically changing the reciprocating position of said work carrier in the direction that it reciprocates, means for automatically changing the speed of rotation of said work carrier, and a stitch forming mechanism adapted to coöperate with said work moving mechanism.

9. A sewing machine comprising a work carrier adapted to be revolved, means for revolving said work carrier comprising an actuating ratchet wheel, a gear wheel that is operated by said ratchet wheel, a second gear wheel in engagement with said first gear wheel, means adapting said second gear wheel to revolve the work carrier, means adapting said second gear to be adjusted about the axis of said first gear wheel whereby the connection between said second gear and the work carrier is changed so that the speed of rotation of said work carrier is varied.

10. A sewing machine comprising a work carrier adapted to be revolved, means for revolving said work carrier comprising an actuating ratchet wheel, a plurality of revolving parts operated by said ratchet wheel, one of said revolving parts in engagement with said work carrier, and means for changing the distance between the axis of one of said revolving parts relative to the axis of the other of said revolving parts and thereby varying the speed of rotation of the part that is in engagement with the work carrier.

11. A sewing machine comprising a work carrier adapted to revolve, a gear wheel in engagement with said work carrier, an arm carried by said gear wheel, a way formed in said arm, a second gear wheel, a shoe carried by said second gear wheel, said shoe located in said way, means adapting said second gear to be adjusted laterally, means for operating said second gear wheel, and a stitch forming mechanism adapted to coöperate with said work moving mechanism.

12. In a sewing machine, a work moving mechanism comprising a revolving work carrier, said work carrier mounted on a carriage, means for revolving said carrier means for reciprocating said carriage comprising an oscillating lever that is pivoted on the carriage, means for oscillating said lever a way formed in the face of the lever, one end of a connection adjustably secured in said way, the other end of said connection connected to a part of the machine that is separate from the carriage, and a stitch forming mechanism adapted to coöperate with said work moving mechanism.

13. In a sewing machine, a work moving mechanism comprising a revolving work carrier, said work carrier mounted on a carriage, means for revolving said carrier means for reciprocating said carriage comprising an oscillating lever that is pivoted on the carriage, means for oscillating said lever a way formed in the face of said lever that extends across the axis of the same, a connection between said way and a part of the machine that is separate from the carriage, and a stitch forming mechanism adapted to coöperate with said work moving mechanism.

14. In a sewing machine, a work moving mechanism comprising a revolving work carrier, said work carrier mounted on a carriage, means for revolving said carrier means for reciprocating the carriage comprising a lever that is pivoted on the carriage, means for oscillating said lever means for adjusting the position of said lever in the direction in which the carriage reciprocates, a connection between said lever and a part of the machine that is separate from the carriage, and a stitch forming mechanism adapted to coöperate with said work moving mechanism.

15. In a sewing machine, a work moving mechanism comprising a work carrier, means for revolving said work carrier means adapting said work carrier to be reciprocated, means for reciprocating said work carrier comprising a lever that is pivoted intermediate of its ends, means for oscillating said lever a way formed in said lever that extends across the axis of the pivot of the same, one end of a connection adjustably secured in the said way, the other end of said connection secured to a part that is separate from the means that adapt the work carrier to be reciprocated, and a stitch forming mechanism adapted to coöperate with said work moving mechanism.

16. In a sewing machine, a work moving mechanism comprising a part adapted to reciprocate, a revolving work carrier located on said part, an operating ratchet wheel journaled in a bearing on said part, means for revolving said work carrier a lever pivoted on said part, means adapting the ratchet wheel to oscillate the lever, a connection between the lever and a part of the machine that is separated from the carriage, and a stitch forming mechanism adapted to coöperate with said work moving mechanism.

17. In a sewing machine, a work moving mechanism comprising a carriage adapted to reciprocate, a work carrier located on said carriage, means for operating said work carrier means for reciprocating the carriage comprising an operating ratchet wheel, a cam groove formed in the side of said ratchet wheel, a lever that is pivoted on the carriage, means adapting said cam groove to oscillate said lever, a connection between the lever and a part of the machine that is separate from the carriage, and a stitch forming mechanism adapted to coöperate with said work moving mechanism.

18. In a sewing machine, a work moving mechanism comprising a carriage adapted to reciprocate, a part carried by said carriage that is adapted to reciprocate in the same direction in which the carriage is adapted to reciprocate, means for reciprocating said part, a lever that is pivoted on the carriage oscillated by said part, a connection between said lever and a part of the machine that is separated from the carriage, and a stitch forming mechanism adapted to coöperate with said work moving mechanism.

19. In a sewing machine, a work moving mechanism comprising a carriage adapted to reciprocate, operating means for reciprocating said carriage, operating means mounted separately from the carriage for changing the working position of said first means, a connection between said first and second means comprising a slide that is adapted to reciprocate between rollers, and a stitch forming mechanism adapted to coöperate with said work moving mechanism.

20. A sewing machine comprising a work carrier carriage, means for reciprocating said carriage comprising a shaft that is carried by the carriage, two arms carried by said shaft, a bar carried by said arms, a shoe mounted on said bar, a lever mounted separately from said carriage, said lever in engagement with said shoe, and means for oscillating said lever.

21. In a sewing machine, a stitch forming mechanism comprising a reciprocating needle that is adapted to be moved laterally, operating mechanism adapted to move the said needle laterally, a work carrier adapted to revolve, means for revolving said work carrier, and a connection between said means and a moving part of the mechanism that moves the needle laterally.

22. In a sewing machine, a stitch forming mechanism comprising a needle adapted to be moved laterally, an operating mechanism adapted to move said needle laterally, a work moving mechanism comprising a work carrier, means for revolving and reciprocating said work carrier, a device for operating said means, and means adapting a part of the mechanism that moves the needle laterally to operate said device.

In testimony whereof I have hereunto signed my name in the presence of two subscribing witnesses.

WILLIAM N. PARKES.

Witnesses:
  J. B. McGIRR,
  W. W. KETCHUM.